US005404467A

United States Patent [19]
Saba et al.

[11] Patent Number: 5,404,467
[45] Date of Patent: Apr. 4, 1995

[54] CPU HAVING PIPELINED INSTRUCTION UNIT AND EFFECTIVE ADDRESS CALCULATION UNIT WITH RETAINED VIRTUAL ADDRESS CAPABILITY

[75] Inventors: John A. Saba, Dracut; Martin J. Schwartz, Worcester; Richard Tank-Kong, Chelmsford, all of Mass.

[73] Assignee: Wang Laboratories, Inc., Lowell, Mass.

[21] Appl. No.: 261,318

[22] Filed: Jun. 16, 1994

Related U.S. Application Data

[63] Continuation of Ser. No. 843,868, Feb. 27, 1992.

[51] Int. Cl.6 ............................ G06F 9/38; G06F 9/26
[52] U.S. Cl. ................................ 395/375; 364/DIG. 1; 364/243.42; 364/231.8; 364/247.3; 364/DIG. 2; 364/938; 364/955.5; 364/964.26; 364/261.7; 364/263.1
[58] Field of Search .......................................... 395/375

[56] References Cited

U.S. PATENT DOCUMENTS

| Re. 32,493 | 9/1987 | Matsumoto et al. | 395/375 |
|---|---|---|---|
| 3,559,183 | 1/1971 | Sussenguth | 340/172.5 |
| 4,112,489 | 9/1978 | Wood | 395/375 |
| 4,430,706 | 2/1984 | Sand | 364/200 |
| 4,477,872 | 10/1984 | Losq et al. | 395/375 |
| 4,679,141 | 7/1987 | Pomerene et al. | 395/375 |
| 4,763,245 | 8/1988 | Emma et al. | 395/375 |
| 4,764,861 | 8/1988 | Shibuya | 395/375 |
| 4,881,170 | 11/1989 | Morisada | 395/375 |
| 4,893,233 | 1/1990 | Denman et al. | 395/375 |
| 4,901,233 | 2/1990 | Liptay | 395/375 |
| 4,984,154 | 1/1991 | Hantani et al. | 395/375 |
| 4,991,080 | 2/1991 | Emma et al. | 395/375 |
| 5,168,557 | 12/1992 | Shibuya | 395/375 |
| 5,303,356 | 4/1994 | Vassiliadis et al. | 395/375 |

FOREIGN PATENT DOCUMENTS

| 0109655 | 5/1984 | European Pat. Off. |
| 0148478 | 7/1985 | European Pat. Off. |
| 0248436 | 12/1987 | European Pat. Off. |
| 0365322 | 4/1990 | European Pat. Off. |

OTHER PUBLICATIONS

Smith, James E., A Study of Branch Prediction Strategies, May 12–14, 1981, 8th Annual Symposium on Computer Archetecture, IEEE, pp. 135–148.
"Highly Accurate Subroutine Stack Prediction Mechanism", IBM Technical Disclosure Bulletin, vol. 28, No. 10, Mar. 1986, pp. 4635–4637.
"Subroutine Call/Return Stack", IBM Technical Disclosure Bulletin, vol. 30, No. 11, Apr. 1988, pp. 221–225.
"Subroutine Return Address Stack", IBM Technical Disclosure Bulletin, vol. 24, No. 7A, Dec. 1981, pp. 3255–3258.

*Primary Examiner*—Robert B. Harrell
*Assistant Examiner*—Timothy L. Philipp
*Attorney, Agent, or Firm*—Kenneth L. Milik

[57] ABSTRACT

A prefetch unit includes a Branch history table for providing an indication of an occurrence of a Branch instruction having a Target Address that was previously taken. A plurality of Branch mark bits are stored in an instruction queue, on a half word basis, in conjunction with a double word of instruction data that is prefetched from an instruction cache. The Branch Target Address is employed to redirect instruction prefetching. The Branch Target Address is also pipelined and follows the associated Branch instruction through an instruction pipeline. The prefetch unit includes circuitry for automatically self-filling the instruction pipeline. During a Fetch stage a previously generated Virtual Effective Address is applied to a translation buffer to generate a physical address which is used to access a data cache. The translation buffer includes a first and a second translation buffer, with the first translation buffer being a reduced subset of the second. The first translation buffer is probed, during a Generate stage, to prefetch, if possible, the required operand. The prefetch unit further provides 24-bit or 31-bit effective address generation on an instruction by instruction basis.

20 Claims, 9 Drawing Sheets

Register to Register

Register to Register (relative)

Register and Indexed Store

RX Modified Format  FIG. 5D

Register and Storage

RS Modified Format  FIG. 5F

Register to Storage (relative)

Storage and Immediate Operand

| OPCODE | I2 | B1 | D1 |
|---|---|---|---|
| 0 | 6 | 16 20 | 31 |

FIG. 5H

Implied Operand and Sotorage

| OPCODE | ----- | B1 | D1 |
|---|---|---|---|
| 0 | 8 | 16 20 | 31 |

FIG. 5I

Storage to Storage

| OPCODE | L or L1/L2 | B1 | D1 | B2 | D |
|---|---|---|---|---|---|
| 0 | 8 | 16 20 | 32 36 | 47 |

FIG. 5J

Storage and Immediate Operand

| OPCODE | L1 | I | 2 | B1 | D1 | B2 | D2 |
|---|---|---|---|---|---|---|---|
| 0 | 8 | 16 | 24 | 32 36 | 48 52 | 63 |

FIG. 5K

CPU HAVING PIPELINED INSTRUCTION UNIT AND EFFECTIVE ADDRESS CALCULATION UNIT WITH RETAINED VIRTUAL ADDRESS CAPABILITY

This is a continuation of copending application Ser. No. 07/843,868, filed on Feb. 27, 1992.

FIELD OF THE INVENTION

This invention relates generally to digital data processors and, in particular, to high performance central processing units (CPUs) having pipelined instruction execution and virtual addressing capabilities.

BACKGROUND OF THE INVENTION:

A pipelined instruction execution unit includes circuitry for implementing a hierarchy of execution elements, each of which is responsive, during a given instruction cycle, to a different instruction. Instructions make their way through the instruction execution unit in sequence such that the various components of the instruction execution unit are utilized in an efficient manner. That is, the various components are kept maximally occupied with instruction decoding, effective address calculations, and other required functions. By example, during a time that a first stage of the pipeline is decoding instruction A, a second stage of the pipeline is calculating an effective address for a preceding instruction B, and a third stage is performing a virtual address translation and operand prefetch for a preceding instruction C.

One problem that arises during the use of such a pipelined instruction execution unit results from the occurrence of conditional Branch instructions. That is, a conditional Branch instruction that advances through the pipeline may or may not alter a currently pipelined sequence of instruction execution.

A number of techniques for accommodating conditional Branch instructions are known in the art. These techniques include: suspending the flow of instruction execution until the conditional Branch is resolved; causing the flow to provisionally take an assumed Branch path; provisionally exploring both possible Branch paths; and predicting an outcome of a conditional Branch based on available information.

One approach for realizing this latter technique is described in U.S. Pat. No. 4,430,706, issued Feb. 7, 1984 "Branch Prediction Apparatus and Method for a Data Processing System", by D. B. Sand This patent discloses the use of a Branch prediction memory and the use of a hash-coded version of an instruction address to access the prediction memory when a conditional Branch instruction is encountered.

The following three IBM Technical Disclosure Bulletins all refer to the use of Branch History Tables (BHTs): "Subroutine Routine Address Stack", Vol. 24, No. 7A, (12/81); "Highly Accurate Subroutine Stack Prediction Mechanism", Vol 28, No. 10 (3/86); and "Subroutine Call/Return Stack", Vol. 30, No. 11 (4/88).

As described in the first above referenced article, a BHT is used to predict branches before they are decoded and maintains a record of the last (n) taken branches by storing the target addresses of the (n) taken branches in an associative or a set associative table. This table is accessed by an instruction address when an instruction is prefetched. If there is a BHT "hit", that is, the table contains an entry for that instruction address, it is indicated that the last time this instruction was executed it was a taken Branch. When the BHT hit occurs, the BHT outputs the corresponding Target Address, which is used to redirect instruction prefetching. The underlying assumption in the use of a BHT is that there is a high probability that if a Branch was taken previously that it will be taken again, and that the Target Address will not change between successive executions of the Branch instruction.

An object of this invention is to provide a pipelined instruction unit and an associated effective address generation unit that employs a BHT, and that also includes novel enhancements to further optimize the efficiency of the instruction unit.

SUMMARY OF THE INVENTION

The foregoing and other problems are overcome and the object of the invention is realized by a instruction prefetch unit that is constructed and operated in accordance with the invention.

The prefetch unit includes a Branch history table for providing an indication of an occurrence of a Branch instruction having a Target Address that was previously taken. A plurality of Branch mark bits are stored in an instruction queue, on a half word basis, in conjunction with a double word of instruction data that is prefetched from an instruction cache. The Branch Target Address is simultaneously prefetched and employed to redirect instruction prefetching. The Target Address is also pipelined and follows the associated Branch instruction through an instruction pipeline.

Each register of the instruction queue and the instruction pipeline includes a valid bit for indicating the validity of the associated register. The prefetch unit includes circuitry for automatically self-filling the instruction pipeline until an instruction having an asserted valid bit is positioned at a Fetch stage of the pipeline. During the Fetch stage a previously generated Virtual Effective Address is applied to a translation buffer to generate a physical address which is used to access a data cache having the operand required by the instruction. In accordance with an aspect of the invention, the translation buffer includes a first and a second translation buffer, with the first translation buffer being a reduced subset of the second. The first translation buffer is probed, during a Generate stage that precedes the Fetch stage, to prefetch, if possible, the required operand. As a result, the operand is made available to an execution unit simultaneously with the operation code for the instruction, thereby achieving an increased speed of instruction execution.

An Effective Address Calculation Unit of the prefetch unit is also pipelined and includes a register for retaining a Virtual Operand Address for use in the case where a predicted Branch is subsequently found to be false. The Effective Address Calculation Unit also includes a copy of the general registers used by the execution unit and provides a mechanism for bypassing the general register copy when it is determined that a general register that is required to calculate an effective address for a first instruction is to be modified by a preceding instruction. A conditional mechanism is provided for suspending the advancement of the pipeline until a preceding instruction has modified the general registers. This mechanism includes a set of pipelined registers that store control information output by a control RAM on an instruction by instruction basis.

This control information thus follows the associated pipelined instruction through the prefetch pipeline. This control information also specifies, on an instruction by instruction basis, a width of an Effective Address that is generated by the Effective Address Calculation Unit. As a result, 24-bit or 31-bit Effective Addresses may be generated on an instruction by instruction basis.

BRIEF DESCRIPTION OF THE DRAWING

The above set forth and other features of the invention are made more apparent in the ensuing Detailed Description of the Invention when read in conjunction with the attached Drawing, wherein:

FIGS. 5A–5K illustrate instruction formats and are useful in understanding the operation of the Effective Address Calculation Unit.

DETAILED DESCRIPTION OF THE INVENTION

Figure 1:
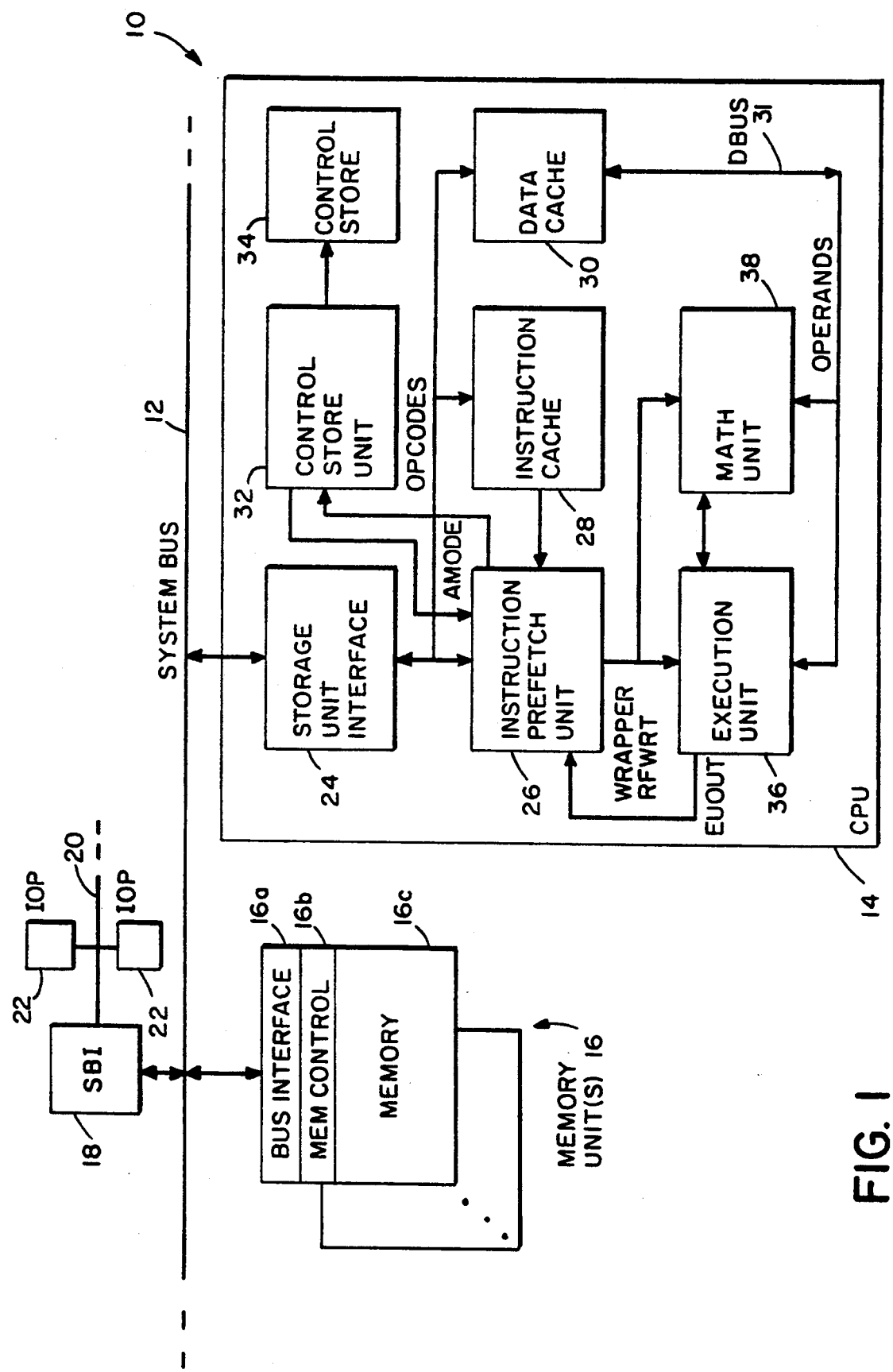
FIG. 1 is a block diagram showing major functional components of a data processing system that employs a Pipelined Instruction Unit constructed and operated in accordance with the invention.

FIG. 1 is a block diagram illustrating a data processing system 10 that includes a System Bus (SB) 12 for coupling together a plurality of bus agents. The System Bus 12 includes a multiplexed system address/data bus path and a control bus path that includes, by example, synchronizing clock signals, read and write strobe signals, and SB 12 arbitration signals. The bus agents include one or more Central Processing Units (CPU) 14 and one or more Memory Units (MU) 16. The MU 16 includes a bus interface unit 16a, a memory control unit 16b, and a memory array 16c for storing macroinstructions and associated operands. Also coupled to the SB 12 is at least one System Bus Interface (SBI) 18 that couples an associated input/output (I/O) bus 20 to the SB 12. Attached to the I/O bus 20 are one or more I/O Processors (IOPs) 22, each of which includes circuitry for interfacing to an associated I/O device, such as a serial or a parallel communications controller and/or a mass storage device. Of particular interest herein is the CPU 14. As can be seen, the CPU 14 includes a number of inter-related functional blocks. These include a Storage Unit Interface (SUI) 26 that couples the CPU 14 to the SB 12 and, hence, to the MU 16 and the SBI 18. Coupled to the SUI 24 is an Instruction Prefetch Unit (IPU) 26, Instruction Cache (IC) 28, and an operand or Data Cache (DC) 30. The construction and operation of the IPU 26 is of particular interest herein, and is described in detail below.

The CPU 14 also includes a Control Store Unit (CSU) 32 that receives macroinstruction operation codes (opcodes) from the IPU 26 and which generates Control Store Addresses (CSAs) for a Control Store (CS) 34. The CS 34 is a memory device that is loaded with microinstructions prior to the operation of the data processing system 10. Specific sequences of microinstructions are selected in accordance with the CSA and are provided as a number of fields of controlling signal lines to the other units of the CPU 14 to control the operation thereof to execute a particular macroinstruction. Execution of the macroinstruction is generally accomplished by an Execution Unit (EU) 36 and/or by a Math Unit 38. The Math Unit 38 provides floating point arithmetic facilities and, in conjunction with the EU 36, is bidirectionally coupled to the DC 30 for receiving operands therefrom and for storing results therein.

Figure 2:
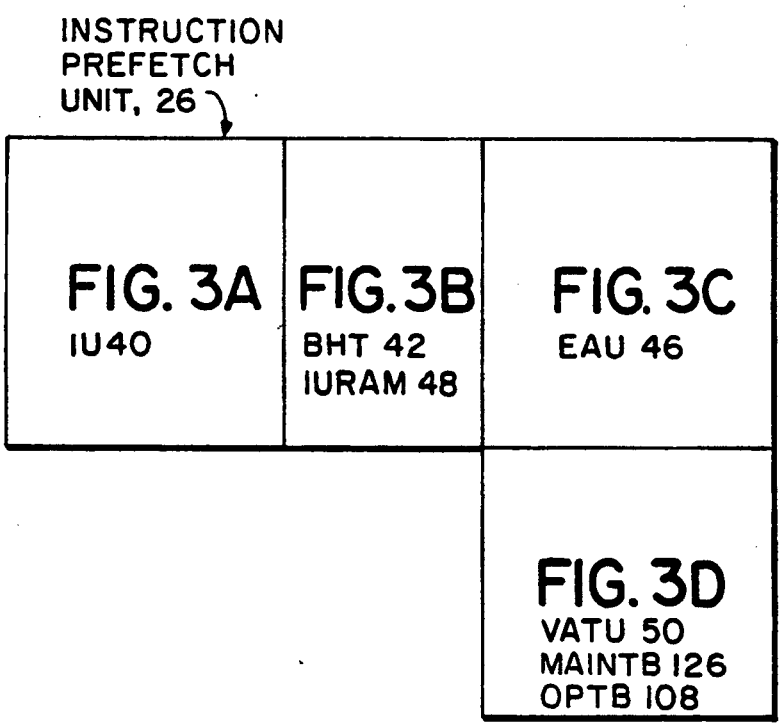
FIG. 2 illustrates the relationship of FIGS. 3A, 3B, 3C, and 3D one to another.
Figure 3A:
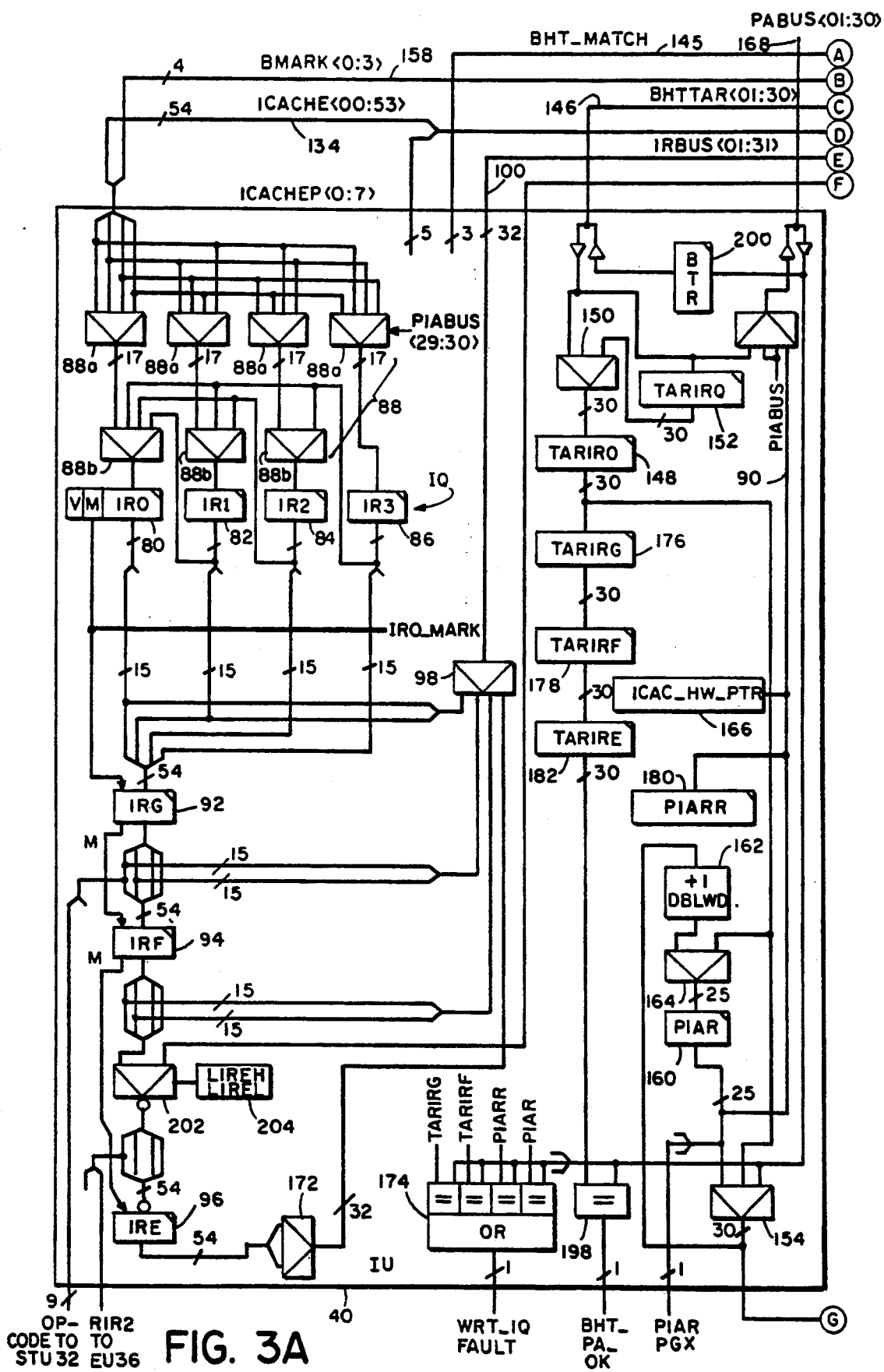
FIG. 3A is a simplified schematic diagram of the Instruction Unit.
Figure 3B:
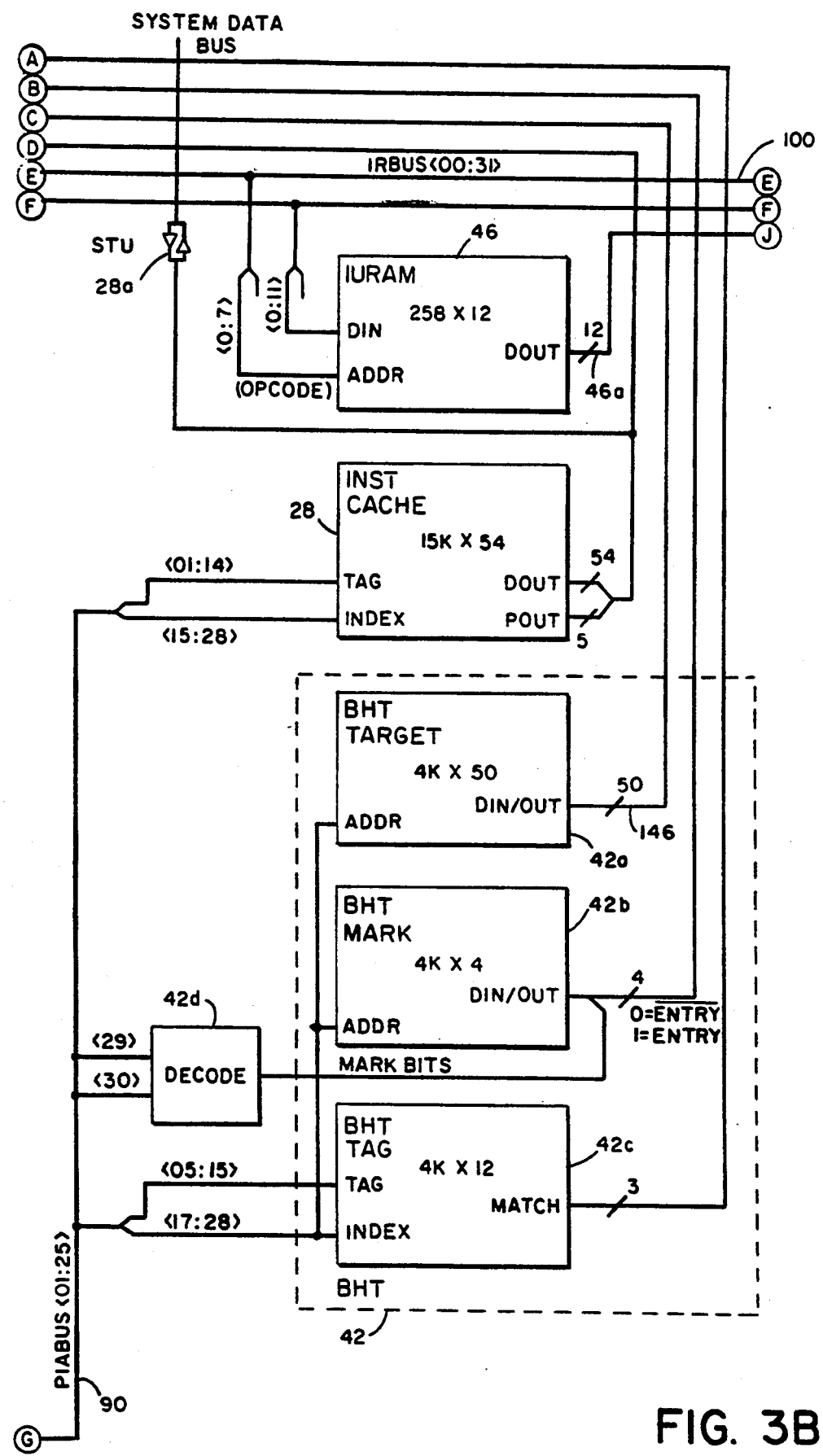
FIG. 3B is a simplified schematic diagram illustrating a BHT, Instruction Cache, and an Instruction Unit Control memory.
Figure 3C:
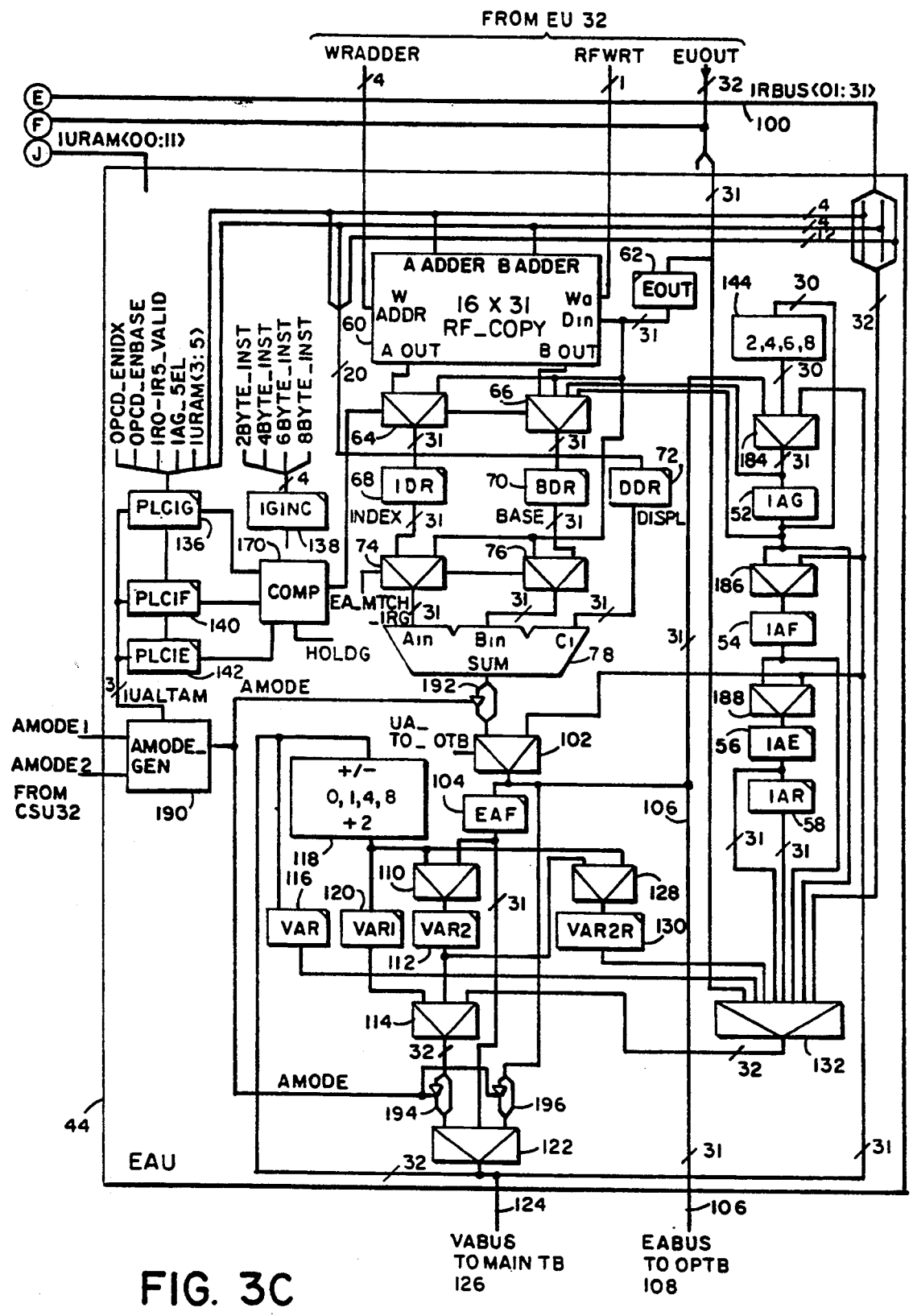
FIG. 3C is a simplified schematic diagram of the Effective Address Calculation Unit.
Figure 3D:
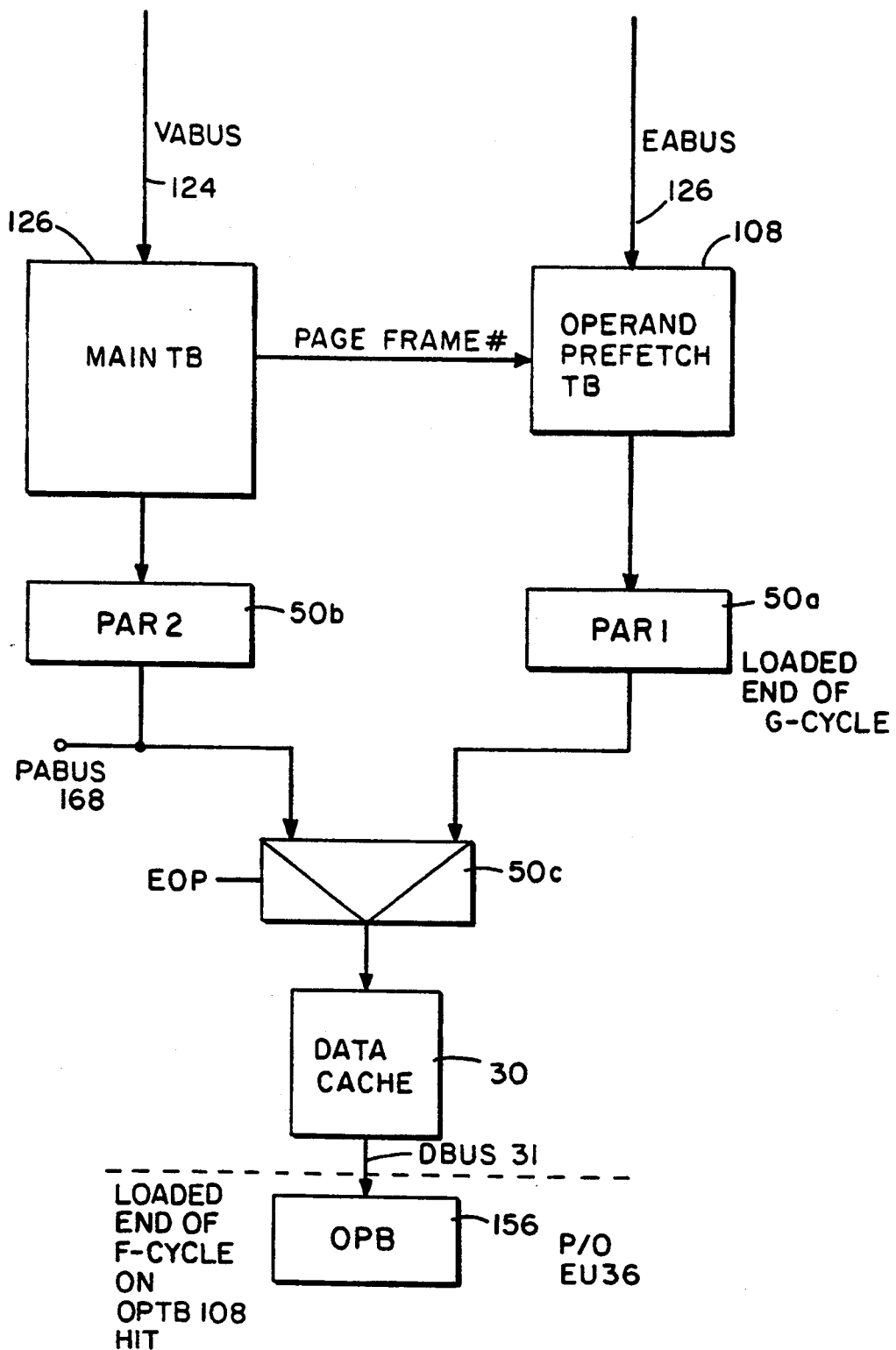
FIG. 3D is a block diagram of a Virtual Address Translation Unit.

The IPU 26 is now described in reference to FIG. 2 and FIGS. 3A–3D. As seen in FIG. 2, the IPU 26 includes an Instruction Unit (IU) 40 (FIG. 3A), a Branch History Table (BHT) 42 (FIG. 3B), an Instruction Unit RAM (IURAM) 48 (FIG. 3B), an Effective Address Unit (EAU) 46, and a Virtual Address Translation Unit (VATU) 50 (FIG. 3D). Although not forming a part of the IPU 26 per se, the Instruction Cache 28 is also shown in FIG. 3B. Similarly, although not forming a part of the VATU 50 per se, the Data Cache 30 is also shown in FIG. 3D.

Figure 4:
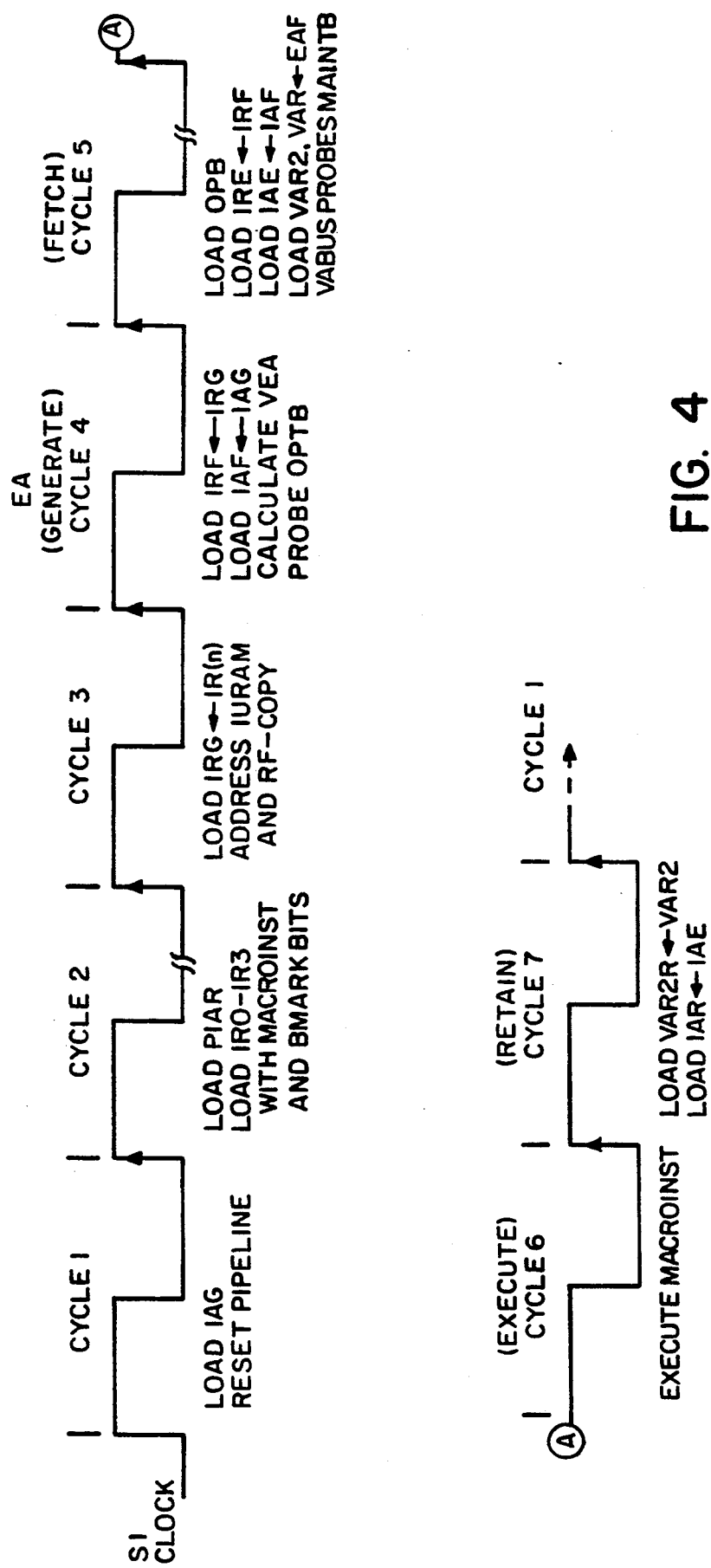
FIG. 4 is a timing diagram that illustrates the operation of the Instruction Unit pipeline for a plurality of consecutive pipeline cycles.

As can be seen in FIG. 4 an instruction prefetch cycle is partitioned into four sub-cycles or microcycles. These sub-cycles correspond to four pipeline stages of the IPU 26 and are referred to herein as a Generate (G) sub-cycle, a Fetch (F) sub-cycle, an Execute (E) sub-cycle, and, for conditional branch-type instructions that employ the BHT 42, a Retained (R) sub-cycle. As such, certain of the register designations of FIGS. 3A–3C include a G, F, E, or R suffix for designating to which pipeline stage the register belongs, and for indicating during which of the sub-cycles the register is active.

In general, the purpose of the IPU 26 is to:
(a) prefetch macroinstructions from the IC 28 to an eight byte FIFO buffer, or Instruction Queue, whenever possible;
(b) to advance the macroinstructions through the pipeline, while calculating virtual operand or Branch addresses for the macroinstructions;
(c) to prefetch, if possible, operand data from the DC 30 based on the calculated address and to load the operand data into a buffer of the EU 36 for immediate use at dispatch time; and
(d) to detect the presence of a Branch instruction in the pipeline, to recall the last direction of the Branch (Branch taken or not taken), and to redirect the macroinstruction pipeline accordingly.

The IPU 26 is specifically concerned with the macroinstruction or macroinstructions that are to follow a macroinstruction that is currently executing in the EU 36, so as to keep the EU 36 maximally occupied with executing instructions.

The following is a description of major components of the IPU 26.

A plurality of registers are provided to maintain a record of the addresses of macroinstructions within the pipeline. These registers form a part of the EAU 44 and include Instruction Address Generate (IAG) 52, Instruction Address Fetch (IAF) 54, Instruction Address Execute (IAE) 56, and Instruction Address Retained (IAR) 58.

The IU 40 includes an instruction queue (IQ) that includes four, 18-bit Instruction Registers (IR0 80, IR1

82, IR2 84, IR3 86). Sixteen of the bits of each register store one or a portion of one macroinstruction, a seventeenth bit stores a BHT 42 Mark (M) bit (if the macroinstruction is a conditional Branch), and an eighteenth bit stores a Valid (V) indicator. Only IR0 80 is illustrated as having 18-bits, it being understood that IR1–IR3 are similarly constructed. A multiplexer group 88 is responsible for loading and aligning IR0–IR3 from the IC 28 under control of bits 29 and 30 (LSBs) of a Physical Instruction Address Bus (PIABUS) 90. The IU 40 is the source for the PIABUS 90. The macroinstruction pipeline is comprised of serially coupled Instruction registers IRG 92, IRF 94, and IRE 96. The operation of these registers is described in detail below.

The EAU 44 also includes a General Register File Copy (RF_COPY) 60 that is implemented as a two-port 16 location by 31-bit RAM. RF_COPY 60 contains a copy of 16 user-visible General Purpose registers contained in the EU 36. When the EU 36 General Registers are written by microcode, the corresponding RF_COPY 60 registers are also updated.

The RF_COPY 60 RAM is configured with three address ports: W_ADDR, A_ADDR, and B_ADDR. The first is an address write port, and the latter two are address read ports. Other inputs are a Write Enable (WE), driven by an EU 36 generated signal RFWRT, and 31 data bits (Din) which are latched by register EOUT 62 from a 32-bit EUOUT bus that is sourced by the EU 36.

The RF_COPY 60 output is configured as two data-out ports (A_OUT, B_OUT) which correspond to one of the read address ports A_ADDR and B_ADDR, respectively.

The RF_COPY 60 is addressed by the base (B1 or B2) and index (X2) fields (FIGS. 5A–5K) of a macroinstruction that is currently in the last two register positions of the instruction queue (IR0 80 and IR1 82). The two output ports of the RF_COPY 60 supply the addressed data, via multiplexers 64 and 66, to two output registers, Index Data Register (IDR) 68 and Base Data Register (BDR) 70, respectively. IDR 68 and BDR 70 are loaded whenever the pipeline is advanced. A third data register, Displacement Data Reg (DDR) 72, is loaded directly from IR1 82, via multiplexer 98 (FIG. 3A), whenever there is a Displacement field coded in the macroinstruction.

RF_COPY 60 can also be addressed by the macroinstructions in IRG 92, IRF 94, or IRE 96, via multiplexer 98. Multiplexer 98 is the source for the 31-bit Instruction Register Bus (IRBUS) 100.

The EAU 44 also includes a 31-bit wide, three port Adder 78. The A port receives address Index data via multiplexer 74, or zero if no Index is coded in the current macroinstruction. The B port receives address Base data via multiplexer 76, or zero if no Base is coded for the current macroinstruction. The B port may also receive an Instruction Address from the IAG 52, via multiplexer 66, if the current instruction has a Relative format. The C port receives Displacement data from DDR 72. The A and B ports can also be supplied directly with EUOUT data, via multiplexers 74 and 76, for the case where a RF_COPY 60 write operation obsoletes the data previously read out and stored in IDR 68 and/or BDR 70, as will be described in greater detail below.

The Adder 78 operates to calculate an Effective Address (EA) by summing the appropriate Index, Base, and Displacement values. The EA is an address of an operand associated with a pipelined macroinstruction, the operand being required by the EU 36, or the Math Unit 38, when the macroinstruction is subsequently executed.

The output of Adder 78 is sourced, through a multiplexer 102, to an Effective Address Fetch register 104 and also, in accordance with an aspect of the invention, to a 31-bit Effective Address (EA) bus 106. EA bus 106 is coupled to an Operand Prefetch Translation Buffer (OPTB) 108 within the VATU 50. The EA bus 106 probes the OPTB 108 during the Generate cycle so as to prefetch from the Data Cache 30 during the Fetch cycle, if possible, the operand that will be required for the macroinstruction that is concurrently stored in IRF 94. If the probe of the OPTB 108 is successful, the operand is made available to the EU 36 at the beginning of the Execute cycle, thereby improving the speed and efficiency of the EU 36.

The output of EAF 104 is provided, via multiplexer 110, to a Virtual Address2 (VAR2) register 112. The output of VAR2 112 is provided, via multiplexer 114, to a multiplexer 122 that sources a Virtual Address Bus (VABUS) 124. VABUS 124 is input to a MAIN Translation Buffer 126 within the VATU 50. VABUS 124 is also provided to a Virtual Address Register (VAR) 116 and as an input to a math block 118 that provides for incrementing or decrementing the VA as required. The output of math block 118 is provided to a Virtual Address Register1 (VAR1) 120, to an input of multiplexer 110, and to a first input of a multiplexer 128. A second input to multiplexer 128 is provided from the output of VAR2 112. The output of multiplexer 128 is provided to an input of a Virtual Address2 Retained (VAR2R) register 130. VAR2R 130 is employed, in accordance with a further aspect of the invention, to store the VA for subsequent use for the case where a predicted outcome of a Branch operation proves to be in error, and thus allows the pipeline to be once more redirected, via multiplexer 132, along the instruction path that was being followed prior to the execution of the conditional Branch instruction. These aspects of the invention will be described in greater detail below.

The three virtual address registers VAR 116, VAR1 120, and VAR2 112 are employed, as required, by the microcode during the Execute phase. The usage of these virtual address registers is also described in detail below.

Control of the IPU 26 is to a large extent hardwired into the IPU 26, with the pipeline attempting to keep itself full of Instruction Cache 28 data and automatically redirecting the instruction prefetch stream upon a Branch taken prediction. When the pipeline runs dry, or when an exception condition is detected, or when a Branch prediction is wrong, the pipeline becomes microcode controlled. Relevant CS 34 microword fields which are supplied to the IU 40 and EAU 46, and their actions, are shown below.

| CS FIELD | ACTION |
|---|---|
| CMD1 | Loading of specific IPU-based registers, resetting of Instruction Queue Valid bits, loading and clearing of the BHT 42. |
| CMD2 | Increment/Decrement control of the VAR's. |
| PRB | Probe control bit for VABUS 124 address. |
| VAS | VABUS 124 source control, and Adder |

| CS FIELD | ACTION |
|---|---|
| | 78 input selection control. |

Having briefly described the IPU 26, a more detailed description of the operation thereof is now provided.

Referring to FIG. 4, an S1 CLOCK defines a plurality of pipeline cycles. By example, S1 CLOCK has a period of 30 nanoseconds. Assuming an empty pipeline (initial condition), during Cycle 1 IAG 52 is loaded from the VABUS 124 and the pipeline is reset. That is, all Valid bits are reset and the BHT 42 is cleared. During Cycle 2, a Physical Instruction Address Register (PIAR) 160 is loaded from a Physical Address Bus (PABUS) 168. The IC 28 is accessed by the PIABUS 90 and, if the instruction is present in IC 28 (cache 'hit'), the instruction is output on ICACHE bus 134. If the instruction is not present (cache 'miss'), the SUI 24 intervenes, obtains the instruction from MU 16, and loads same from the SYSTEM DATA BUS, via transceiver 28a, into the IC 28. As a result, Cycle 2 is shown as having a variable period so as to account for possibility of the IC 28 miss occurrence.

The addressed macroinstruction first enters the pipeline at IR0 80 to IR3 86. These four registers are each a halfword (16-bits) in length and are capable of being individually loaded, via multiplexers 88a, from any halfword point on an IC 28 data bus (ICACHE 134). Also, IR0 80, IR1 82 and IR2 84 are each loadable, via multiplexers 88b, from any more significant IR register on a 1 to 3 halfword basis.

During Cycle 3, the instruction in IR0 80 and IR1 82 supplies the A and B addresses to RF_COPY 60. The A and B addresses are used to retrieve associated data for the Effective Address Calculation. At the end of this pipeline stage (Cycle 3) accessed RF_COPY 60 data is loaded into IDR 68 and BDR 70. Also, if appropriate, DDR 72 is loaded from IR1 82. Also, one or more of the IR0–IR3 registers are loaded into IRG 92, depending on the length of the macroinstruction.

During Cycle 3, the OP code of the macroinstruction currently residing in IR0 80 is used to address, via IRBUS 100, the Instruction Unit RAM (IURAM) 46. IURAM 46 is configured as a 256×13-bit RAM and contains IPU control information for each opcode. This control information is output on IURAM bus 46a and is latched into a register PLCIG 136 and into a register IGINC 138. IGINC 138 contains information relating to the length of the instruction (2–8 bytes).

The bits of the IURAM 46 are partitioned into bit sets. A first bit set (bits <00:02>) conveys information related to the Effective Address sources for the RF_COPY 60. Bits <03:05> control Specification Exception checking and control the testing of R1 and R2. Another bit, when asserted, indicates single or double precision floating point format for the macroinstruction. A further bit, when asserted, indicates that the corresponding instruction is of a type that requires an Operand Prefetch operation. This bit, in conjunction with a microcoded Enable Operand Prefetch (EOP) cycle, enables address translation of the EAF and probing of the OPB 156. This bit is advanced down the pipeline through PLCIF 140 and PLCIE 142 and, thus, may be tested when the corresponding instruction is in IRE 96.

Bit 8 of the IURAM 46, when asserted, indicates that the corresponding instruction is an instruction type maintained by the BHT 42. In order for an instruction, having a Branch Mark bit on, to redirect the pipeline bit 8 of the IURAM 46 must also be on. If this bit is not on, and the associated instruction's BMARK bit is asserted, then an error condition is indicated. Bit 9 indicates which of two AMODE control lines is to be used by the current instruction in conditioning bits <01:07> of the Virtual Address. This bit relates to 24/31 bit addressing, which is described in detail below. Bits 10 and 11 indicate a RF_COPY 60 write category. These categories include: no write is performed, the instruction writes a register as addressed by the R1 field, the instruction writes a register pair as addressed by the R1 field, or the instruction (potentially) writes all registers.

Another bit of the PLCI registers indicate that the associated instruction contains a Base field. Three bits indicate that the R1 address field of the instruction at the PLCIF and PLCIE stages are compared against the Index and Base Address Fields of the instruction in the PLCIG stage. If a match is detected then a HOLDG signal is generated to prevent the G stage from advancing until the matching instruction exits from the E stage. Three other bits of the PLCI registers indicate that the Index and Base fields of the associated instruction are to be maintained for comparison against the F and E stage and, also, against RF_COPY writes from the EU 36.

The rising edge of the S1 CLOCK, at the end of Cycle 3, initiates the Effective Address Generate (G) step of Cycle 4. During this step, Adder 78 generates a Virtual Effective Address (VEA) which is sourced to the EABus 106 to probe the OPTB 108. If the probe is successful, the physical address output by the OPTB 108 is used to access the DC 30 to prefetch the operand that will be required by the instruction that is presently stored in IRG 92.

The output of PLCIG 136 is transferred to a register PLCIF 140 when the instruction passes from the Generate to the Fetch Stage (Cycle 5), and from PLCIF 140 to a register PLCIE 142 when the instruction passes from the Fetch to the Execute stage (Cycle 6). As a result, the control information associated with the instruction is also pipelined and follows the instruction as it progresses through the various stages of the IPU 26.

Returning to the discussion of Cycle 2, a determination is made as to whether the instruction is a Branch instruction that was previously taken. This is accomplished by probing the BHT 42 with the physical address of the instruction over the PIABUS 90. If the BHT 42 has a corresponding entry, as indicated by the output of BHT_TAG RAM 42c being asserted on a BHT_MATCH bus 145, the previous Branch Target Address is output from BHT TARGET RAM 42a on BHTTAR bus 146, and the Branch Target Address is stored, via multiplexer 150, in register TARIR0 148 or, if TARIR0 148 is temporarily occupied, in TARIRQ 152. The Branch Target Address is then supplied, via multiplexer 154 and PIABUS 90, to address the IC 28 to begin pipeline redirection for the next macroinstruction. That is, the instruction residing at the Branch Target Address is prefetched, instead of the next sequential macroinstruction that follows the Branch macroinstruction.

In greater detail, the BHT_TAG RAM 42c is probed with PIABUS 90, specifically 12 Tag bits <05:16>. If the probe is successful three Match bits are output to BHT_MATCH bus 145. Each Match bit corresponds to four of the 12 Tag bits. These Match bits are ANDed together and enable the loading of the Mark bits, being output by BHT_MARK RAM 42b, into the corresponding IR0-IR3. The Match bits also enable the loading of TARIR0 148, or TARIRQ 152, with an associated Branch Target Address output by BHT_TARGET RAM 42a.

During Cycle 4, IAG 52 contains the address of the macroinstruction which is in IRG 92. In this pipeline stage the operand prefetch is attempted based on the calculated EA. Also, based on the IURAM 46 control bits the inputs to the ADDER 78 are selected. At the end of this pipeline stage the ADDER 78 output is loaded into the EAF 104 register for use in the next stage.

During Cycle 5 IAF 54 contains the address of the macroinstruction which is in IRF 94. In any microcycle which has the VABUS 124, DC 30, and a CPU 14 internal Data Bus (DBUS 31) free, and which has a Dispatch (DISP) or Advance Pipeline (APL) microinstruction coded; a micro-coder codes an EOP (Enable Operand Prefetch) command. If the instruction in the F stage has IURAM 46a bit <07> on, and EOP is coded in the micro-word, then an EOP cycle will occur.

During an EOP cycle the virtual address in EAF 104 is sourced onto the VABUS 124, translated into a physical address by a MAIN TB 126 of the VATU 50, a data access to the DC 30 is performed, and the output of DC 30 is loaded into an Operand Prefetch Buffer (OPB) 156 (FIG. 3D) for use by the EU 36. The physical address is also loaded into a Physical Address Register PAR2 50b that is contained within the VATU 50.

Selection of a physical address for probing the DC 30 is made by a multiplexer 50c, which selects between the PAR2 50b or the PAR1 50a (FIG. 3D). If, during an EOP cycle, an Address Translation fault, or Protection Violation, or DC 30 Miss, or any other SIU 24-type exception is encountered, then the OPB 156 is not loaded and the condition is appropriately handled when and if a read of the OPB 156 is attempted by the EU 36. Upon a DISP or APL cycle, EAF 104 is loaded into VAR2 112, and is also probed in the MAIN TB 126, with the physical address being loaded into PAR2 50b (FIG. 3D).

During Cycle 6, IAE 56 contains the address of the macroinstruction which is stored in IRE 96. At this stage, the microcode completes the execution of the instruction in the EU 36 and/or Math Unit 38.

At this point, that is, the first cycle of a macroinstruction execution, the machine state is as follows.
IAE 56 Address of the currently executing macroinstruction;
IRE 96 The currently executing macroinstruction;
VAR2 112 Virtual Address of Operand2 (OP2), or OP1 if a Storage-to-Storage (SS) macroinstruction;
PAR2 50b Physical Address of OP2, or OP1 if an SS macroinstruction; and
OPB 156 Macroinstruction OP2 data, or OP1 if an SS macroinstruction (assuming that an EOP cycle was executed).

The pipeline is made to advance whenever a DISP (Dispatch) microinstruction is encountered. The pipeline can also be advanced by the following two other events.
1. Advance Pipeline (APL) microinstruction. This microinstruction functions identically to a DISP, except that it does not change a MIA (Micro-Instruction Address) stored within the CSU 32.

2. IRF 94 not valid. If the Fetch pipeline stage is not valid, (V=0) the pipeline advances on each S1 CLOCK cycle attempting to make IRF 94 valid. The pipeline advances only as far as the F stage, and only if microcode has enabled a SELF-FILL mode of operation. This automatic advancing is performed in an attempt to ready an instruction for execution when called upon by a DISP or an APL command.

When DISP or APL is microcoded, the pipeline unconditionally advances.

In general, prefetching brings macroinstructions from the IC 28 to the IR0-IR3 registers before they are actually executed, so that they will be immediately available when needed. Prefetching also brings in Branch Mark bits from a BHT_MARK_RAM 42b of the BHT 42. The Branch Mark bits indicate whether the associated prefetched macroinstruction is a Branch that is predicted to be taken.

The Physical Instruction Address Bus (PIABUS) 90 is the address source to both the IC 28 and the BHT 42 RAMs. After being addressed, the IC 28 sources a doubleword (64-bits) of data onto the ICACHE bus 134 (ICACHE<00:63>), and the BHT 42, specifically the BHT_MARK_RAM 42b, sources to the IQ a BHT hit/miss indication over a BMARK bus 158. This data is loaded into the available IR registerer(s) IR0, IR1, IR2, and IR3. The PIABUS 90 has three possible sources, as selected by multiplexer 154:

| PIABUS Source | Event |
| --- | --- |
| PIAR 160 | Normal prefetch operation; |
| PAR via PABUS 162 | LPIAR/FETCH or BHT control commands coded; or |
| TARIR0 148 | Branch Mark bit on in IR0 80 (IR0_MARK), which indicates pipeline redirection. |

If the requested data is not found in the IC 28, or if the requested data crosses a page boundary during a prefetch, the IQ will not be loaded and will be allowed to run dry. No attempt is made to bring the data in from MU 16.

During a prefetch, the IQ determines if it requires IC 28 data based on two conditions. A first condition is a current status of each of the halfwords (IR0-IR3) of the queue. The second condition is what the status of each halfword is expected to be at the completion of the cycle. If it is determined that at the end of the cycle the buffer will have at least one halfword (IR) register empty (invalid data), then the Instruction Queue fills one or more of the IR0-IR3 registers from the IC 28.

When the instruction queue determines it will be finished with the current doubleword of IC 28 data, and that it requires data from the next doubleword, then a load of PIAR 160 from the PIABUS 90 is accomplished via multiplexer 154, +1 doubleword adder 162, and multiplexer 164.

In that data is extracted from the ICACHE bus 134 with a halfword granularity, a method is required to identify which portions of the doubleword of IC 28 data is still available for use. As an example, a case is considered where a string of 10 Register-to-Register (RR) (FIG. 5A) macroinstructions (16-bit instructions) start on a doubleword boundary, and where the IQ is empty. The CYCLE designators in this example do not correspond to the Cycles shown in FIG. 4.

CYCLE 1 The first prefetch brings the first four RR instructions into IR0–3, and PIAR 160 increments to the next doubleword, thus pointing to RR #5, 6, 7, and 8 within IC 28.

CYCLE 2 RR #1 advances from IR0 80 to IRG 92, and RR #2, 3, and 4 advance to IR0–IR2 via multiplexers 88b. The prefetcher, detecting that IR3 86 will be available at the end of this cycle, supplies RR #5 to IR3 via the associated multiplexer 88a.

CYCLE 3 RR #1 advances from IRG 92 to IRF 94, RR #2 moves to IRG 92, and RR #3, 4, and 5 move to IR0–2. Once again the prefetcher determines that IR3 will be available by the end of this cycle and supplies RR #6 to IR3. In order to accomplish this loading of IR3 the prefetcher must have a record of which IC 28 halfword is now required, and which halfword has already been used. For this example, RR #5 was at a doubleword boundary and already used, and the required RR #6 is at the next halfword location.

CYCLE n This sequence of events continues as the prefetcher extracts the IC 28 data, updating PIAR 160 only when the prefetcher finishes with a doubleword.

To maintain a record of the IC 28 doubleword the IU 40 includes an Instruction Cache Halfword Pointer (ICAC_HW_PTR <0:1>) 166. This 2-bit pointer, as the name implies, points to which halfword of a doubleword is next to be brought into the IR0–IR3 registers from IC 28. The pointer is updated every cycle and is sourced back to itself unchanged in cycles when data is not removed from the IC 28.

The ICAC_HW_PRT 166 is initialized to the value on PIABUS <29:30> whenever a Load PIAR (LPIAR) command is executed, or whenever a BHT_REDIRECT signal is active due to the Branch Mark bit being on in IR0 80 (IR0_MARK asserted), this latter condition indicating that the pipeline is being redirected and that an IC 28 access is being made via TARIR0 148. The LPIAR microcoded command loads PIAR 160 from PAR2 50b, via the PABUS 168, sources PAR2 50b to the PIABUS 90 via multiplexer 154 as the IC 28 address, and re-enables IPU 26 prefetching.

Also associated with the PIAR 160 is a PIAR_PGX signal which is supplied from the IU 40 to the CSU 32 and which, when active, indicates that PIAR 160 has been incremented across a page boundary.

Another signal of interest is referred to as BHT_REDIRECT. This signal causes the pipeline prefetcher to be redirected to a new instruction address stream. This signal is asserted for one cycle when a Branch Mark arrives in IR0 80 (IR0_MARK is asserted), and when the full Branch instruction is contained in the other IR regs (i.e. IR1-3). When BHT_REDIRECT is active, TARIR0 148 is driven to the PIABUS 90, via multiplexer 154, for one cycle. At the end of the cycle PIAR 160 is loaded with PIABUS 90 plus one doubleword, via adder 162 and multiplexer 160, and thus points to the next instruction following the Branch Target address.

Each pipeline stage has an associated Valid bit. Each Valid bit indicates the validity of the corresponding pipeline stage.

The Valid bits are designated as follows.

| Bit | Association |
| --- | --- |
| IR3_QVALID | IR3 86 |
| IR2_QVALID | IR2 84 |
| IR1_QVALID | IR1 82 |
| IR0_QVALID | IR0 80 |
| IRG_QVALID | IRG 92 |
| IRF_QVALID | IRF 94 |
| IRE_QVALID | IRE 96 |

The Valid bits are set whenever valid data from a preceding stage is propagated forward into the next stage and, in the case of IR0–3, whenever valid data is received from the IC 28.

The Valid bits are reset whenever IAG 52 is loaded (by microcode), or when invalid data from a preceding stage is propagated forward to the next stage. In the latter case this would begin at the IR0–3 stage when the IC 28 cannot supply data, due to an IC 28 miss or a similar event. IR0–3 are marked as invalid, and this invalidity eventually propagates through IRG 92, IRF 94, and IRE 96.

It is noted that the IRE 96 may also be directly loaded from the EUOUT bus by two consecutive word loads, via multiplexer 202 under the control of logic 204 (Load IRE High and Load IRE Low).

Instruction Not Ready (INR) is a condition in which the pipeline, at a minimum, has no valid instruction in the F stage and a DISP is coded by the microcode.

Reasons for the occurrence of an INR condition are as follows.

1. A miss has occurred in the IC 28 and instruction data must be fetched from the MU 16.
2. A string of DISPs is being executed, requiring the pipeline to advance every cycle, but an instruction crosses an IC 28 entry (doubleword). As a result, it requires two cycles for IR0–IR3 to receive the instruction. However, the pipeline is requesting one instruction every cycle. This places a 'bubble' in the pipeline, i.e., a single pipeline stage is invalid, but surrounding stages are valid.
3. The G stage was held because the F or E stage was writing a register used by G for Effective Address calculation. This condition is indicated by the generation of a HOLDG signal by a comparator 170 (FIG. 3C). This condition also has the effect of placing a 'bubble' in the pipeline.

To accommodate INR's, three different dispatch exceptions are employed so as to enable the microcode to uniquely identify and handle each type of exception. These dispatch exceptions are as follows.

INRPX—INR Page Cross—Microcode translates the new page address and reloads PIAR 160 with the newly translated page address.

INRPIPE—INR Pipeline—For the case where there are no valid instructions in the pipeline, a Fetch Memory Operation (MOP) is coded to retrieve data from MU 16.

INRFTCH—INR Fetch—The F stage is invalid but G and/or IR0–3 are valid ('bubble' case). A No Operation (NOP) is coded, allowing the pipeline to Self-Fill to the F stage. Then an EOP or DISP is executed to move F to E.

INR dispatch exceptions do not occur until the instruction which is not ready is about to be executed, i.e. a DISP (or JOP) command is executed. That is, IAE 56 contains the instruction address of the instruction which is not ready; PIAR 160 is pointing to the doubleword of the Not Ready macroinstruction, if the INR is due to an IC28 miss; and, for INRPX, IR0-2 may contain none or part of the Not Ready macroinstruction.

So as to better describe the operation of the EAU 44 in generating virtual effective operand addresses, reference is made to FIGS. 5A-5K for showing a number of halfword (FIG. 5A), word (FIG. 5B-5I), word and a half (FIG. 5J), and doubleword (FIG. 5k) macroinstructions. In the macroinstruction formats shown in FIGS. 5A-5K the X and B fields are RF_COPY 60 addresses that contain address index and base information, respectively. The D field is the address displacement, or a 16-bit or 20-bit L field which is an address displacement for Program Counter (PC 50b) relative instructions. It is noted that the shorter 4-bit and 8-bit L fields in SS and SSI formats are operand length fields, are not employed for effective address computation.

Figure 5A:
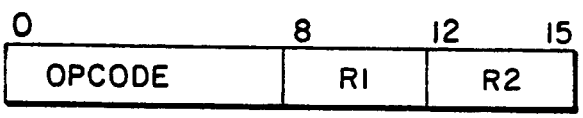

Register to Register (RR)—FIG. 5A

R2 is supplied at the ADDER 78 output if the instruction is a branch-type which uses the Branch History Table 42, otherwise no EA calculation is performed.

Figure 5B:

Register to Register (relative) (RL)—FIG. 5B

RL-type instructions are PC 50b relative instructions. That is, the operand address is located in relation to the Program Counter which contains the address of the currently executing macroinstruction. When the address is generated in the ADDER 78, the macroinstruction is not currently executing, but is in the Generate pipeline stage. Therefore, PC 50b relative addresses are generated relative to IAG 52. For RL type instructions, the ADDER 78 generates the operand 2 address by adding L2 to the contents of IAG 52.

Figure 5C:
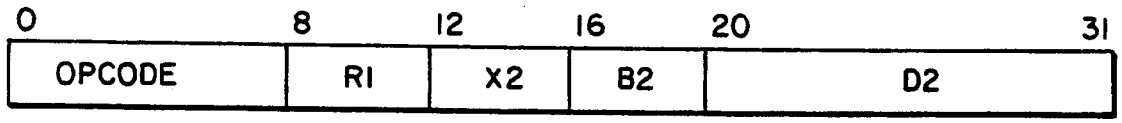

Register and Indexed Store (RX)—FIGS. 5C and 5D

For RX-type instructions, the ADDER 78 generates the operand 2 address by adding X2 to B2 to D2.

Some RX instructions use a modified format which is shown in FIG. 5D. For RX Modified-type instructions, the ADDER 78 generates the operand 3 address by adding X3 to B3.

Figure 5E:
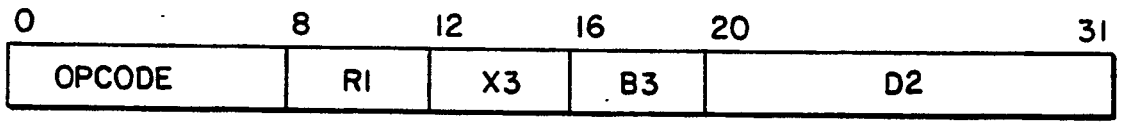
Figure 5E:
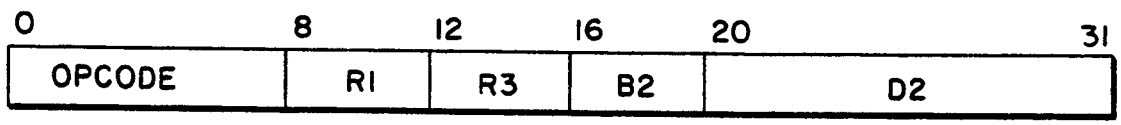

Register and Storage (RS)—FIG. 5E and 5F

For RS-type instructions, the ADDER 78 generates the operand 2 address by adding B2 to D2. Some RS instructions use a modified format which is shown in FIG. 5F. For the modified RS format no EA calculation is performed.

Figure 5G:
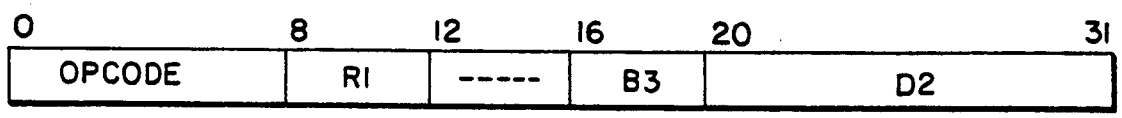
Figure 5G:
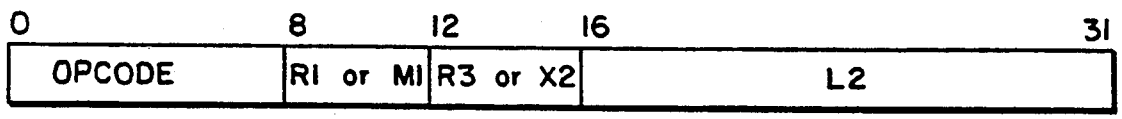

Register to Storage (relative) (RRL)—FIG. 5G

RRL instructions are also PC 50b relative. One RRL instruction includes an index field which is used in the effective address generation. Other types use the X2 field for a third operand register. In both cases, the relative displacement field (L2) is contained in bits 16 to 31. For RRL type instructions, the ADDER 78 generates the operand 2 address by adding L2 to IAG 52.

Storage and Immediate Operand (SI)—FIG. 5H.

For SI-type instructions, the ADDER 78 generates the operand 1 address by adding B1 to D1.

Implied Operand and Storage (S)—FIG. 5I

For S-type instructions, the ADDER 78 generates the operand 1 address by adding B1 to D1.

Storage to Storage (SS)—FIG. 5J

For SS type instructions, the EAU 44 must generate two operand addresses, operand 1 and operand 2. During the Generate pipeline stage the operand 1 EA is automatically generated. The operand 2 EA is generated under microcode control, when the macroinstruction is contained in IRE 96.

For SS type instruction, the ADDER 78 generates the OP1 address by adding B1 to D1. During the first two cycles of an SS format instruction the OP2 EA is generated under microcode control according to the following procedure:

1. Source IRE 96 bits (32:47) to the RF_COPY 60 via multiplexers 172 and 98, access the Base register data, load BDR 70 and DDR 72 at the end of the cycle (IDR 68 is loaded with zero);
2. Source IRG 92 bits (12:31) to the RF_COPY 60 via multiplexer 98, access the data for this stage, and load IDR 68, BDR 70, and DDR 72 at the end of the cycle (thus restoring the IRG 92 stage), VABUS 124=ADDER 78 output, load VAR1 120 (from VABUS 124) at the end of the cycle (OP2 EA of IRE 96 stage); and Probe the VABUS 124 (PAR2 50b receives the EA at end of cycle).

Storage and Immediate Operand (SSI)—FIG. 5K

SSI instructions are four halfwords in length. When the microcode dispatches to an SSI instruction no effective address components will have been automatically generated. Microcode may use the ADDER 78 to generate OPI's EA in the same manner that it uses the ADDER 78 to generate the OP2 EA for SS format instructions, as described immediately above. Also, IRE 96 is read to obtain the D2 field, and the EAU 44 ADDER 78 is employed to generate the OP2 EA.

In summary, the Effective Address (EA) for the operand of the prefetched instruction is produced at the Generate stage by adding together the appropriate components of the instruction to form a single EA. The EA is a virtual address that points to the operand data in memory. For example, in the RX format instruction the EA will result from the addition of X2, B2, and D2 fields.

However, in that the pipeline is operating with prefetched instructions and is also pre-calculating effective addresses, a possibility exists for the EU 36 to write a General Register that is being or will be used to calculate an EA for a subsequent macroinstruction that is in the process of being prefetched by the IPU 26. This is of concern if the instruction in execution (the E stage) is writing a general register of any instruction in the pipeline (F, G, or IR0-IR3 stage), and that register is required for an EA calculation. When this condition occurs, the pipeline is considered to have an Invalid Effective Address (IEA).

IEA's can occur in any pipeline stage, and are handled by two distinct methods depending on which stage is being effected. The methods are as follows.

In the EAU 44 the instruction control bits in the E and F stages are checked, using the comparator 170, against the instruction control bits in the G stage. If either E or F instruction is determined to be writing a register which is used by G to form an EA, then the entire G stage of the IU 40 and EAU 44 is held from advancing to F (HOLDG) until the instruction performing the write leaves the E stage, i.e. the write has been completed.

For this first method, the HOLDG is generated by examining the PLC registers (136, 140, 142) and determining if (a) the associated instructions write the RF_COPY 60, (b) if the instructions write a general register other than 0, (c) if the R1 address matches the Index or Base address, and (d) if the stages being compared also have their Valid bits set.

If all of these conditions are met the G stage is held until the instructions in E and F have executed (i.e. IRE/F Valid is off). When the instruction that writes R1 executes in the E stage, then circuitry in the EAU 44

G stage detects the write to the RF_COPY 60 and updates the RF_COPY 60.

For the second method referred to above, if an instruction in IR0 detects a write to a RF_COPY 60 address which it is using for an Index or Base look-up, and the pipeline is being advanced (DISP/APL), then the RF_COPY 60 is bypassed and EOUT data is loaded directly into IDR 68 and/or BDR 70, via EOUT 62 and multiplexers 64 and/or 66. The RF_COPY 60 is also written as would normally occur.

A further bypass is made if the next consecutive cycle is one which also advances the pipeline. This is performed in that, before IDR 68 or BDR 70 could be updated, and due to pipelining features of the EU 36, the data contained in IDR 68 and BDR 70 is required for the G stage EA calculation. If this is condition is true, then IDR 68 and/or BDR 70 are also bypassed and EOUT 62 data is provided directly to the inputs of ADDER 78, via multiplexers 74 and 76. As before, the RF_COPY 60 is also updated (written) with the appropriate data from EOUT 62.

A discussion is now made of Instruction Queue write faults. When a cache/memory write is performed to a physical address that is currently in the Instruction Queue, then before the next macroinstruction is executed the IQ must be invalidated and re-filled. This insures that the IQ contains only up-to-date data, in that the write may have modified a soon to be executed macroinstruction. This occurrence is a result of a programming technique referred to 'self modifying code'.

The EU 40 performs a physical address comparison using a comparator 174 to compare the content of the PABUS 168 to the contents of PIAR 160, to the contents of a Retained Physical Instruction Address Register (PIARR) 180, and to the contents of the G and F pipeline stages of the Target Instruction Registers, TARIRG 176 and TARIRF 178, respectively. An E stage Target Instruction Register (TARIRE) 182 does not form a part of this comparison, as the associated macroinstruction in IRE 96 is the macroinstruction that is currently executing. If an equal condition is found, the signal WRT_IQ_FAULT is asserted. This signal line is provided to the CSU 32, where the signal is AND'ed with a MOP microinstruction field. If the MOP field codes a Write, then on a next DISP a WIQF dispatch exception will occur.

Whenever microcode loads the IA registers all pipeline valid and Branch mark bits are reset. The Prefetch mode is also turned off. When the microcode loads these registers, IAG 52, IAF 54, and IAE 56 are loaded from the VABUS 124 via multiplexers 184, 186, and 188, respectively. Thus, all IA registers, with the exception of IAR 58, are initialized with the same VA address in an empty pipeline state (Cycle 1, FIG. 4).

Whenever the pipeline is advanced with an APL or DISP microinstruction, then IAF 54 data is clocked into IAE 56, via multiplexer 188. Whenever the pipeline is advanced via an APL, DISP, or Self-Fill, then IAF 54 clocks in IAG 52 data, via multiplexer 186, and IAG 52 is loaded with an incremented address generated from the output of IAG 52 through adder 144 and multiplexer 184. Adder 144 adds +2, +4, +6, or +8, under the control of IGINC 138, to reflect the length of the macroinstruction being transferred from the G to the F stage.

One additional source that may load IAG 52 is the EA output of the Adder 78 that is applied through multiplexers 102 and 184. This source is employed only for Branch instructions that are predicted to be taken, and is thus used to redirect operand prefetching to the anticipated Branch Target Virtual Address.

IAR 58 is loaded from IAE 56 whenever an APL or DISP is coded, and the E stage is valid (IRE_VALID=1) (Cycle 7, FIG. 4). This Retained address register is used by the microcode to recover, when needed, the virtual address of an instruction which has been advanced out of the pipeline E stage by a DISP/APL, and which had a conditional Branch test condition go false. One primary utilization of this recovery mechanism is for RX-type instructions which advance the pipeline before a determination is made if the test condition being used is true. If the test condition is later determined to be false, then the microcode is enabled to retrieve the operand address of the next sequential instruction from IAR 58. For this case the output IAR 58 is applied, via multiplexer 132, to the multiplexer 114 and 122 and, hence, to the VABUS 124.

Of the above mentioned Virtual Address Registers, VAR 116, VAR1 120, and VAR2 112 all reside at the E stage of the pipeline. VAR2R 130 resides at the Retained stage of the pipeline.

The VAR's, their usage, and their loading is now described in greater detail.

| REGISTER | DESCRIPTION |
|---|---|
| VAR 116 | General purpose, used by the microcode, loaded from the VABUS 124 on DISP, APL, Probe and OPE cycles. |
| VAR1 120 | General purpose, used by the microcode, loaded from the VABUS 124 when VAR1 120 is the source to the VABUS 124 and when the microcode is any increment or decrement command. For this condition VAR1 120 is loaded from the VABUS 124 via math block 118 where the appropriate incrementing or decrementing occurs. |
| VAR2 112 | General purpose, used by the microcode, loaded from the VABUS 124 when VAR2 112 is the source to the VABUS 124 and when the microcode is any increment or decrement command. For this condition VAR2 112 is loaded from the VABUS 124 via math block 118 and multiplexer 110 with the appropriate incremented or decremented Virtual Address. |
| VAR2R 130 | Retained register, used by the microcode to recover, when needed, the virtual operand address used by an instruction which had been advanced out of the pipeline E stage by a DISP/APL, and which had a test condition subsequently be determined to be false. |

As can be seen in FIG. 3D, the VATU 50 is configured as a Translation Lookaside Buffer, and provides a mechanism for translating Virtual Addresses generated by the EAU 44 into physical addresses used to access data in the Data Cache 30 and Memory Unit 16. There are two major components of the VATU 50, the Main Translation Buffer 126 and, in accordance with an aspect of the invention, the Operand Prefetch Translation Buffer (OTPB) 108.

The Main Translation Buffer 126 contains 4K entries, each of which contains the Tag bits needed to indicate a hit, the Page Frame Number, Valid bits, Read and Write Protection Levels, Change and Prefix bits, and several associated parity bits. The Main Translation Buffer 126 is probed in the Fetch stage of the Instruction Execution pipeline and a physical address is obtained. In addition, several status conditions are generated. These status conditions may cause system traps to occur when an operation using the physical address is subsequently attempted.

Loading of the Main Translation Buffer 126 is under microcode control. Invalidation of single entries, all user entries (Monitored), or the entire buffer is executed in one cycle.

The Operand Prefetch Translation Buffer 108 is a subset of the Main Translation Buffer 126 and contains 256 entries. Each entry includes only the Tag bits needed to indicate a hit, the Page Frame number to generate the physical address, and associated parity bits. The OPTB 108 is probed in the latter part of the Generate stage of the Instruction Execution pipeline in order to generate a physical address used to access the Data Cache 30 during the Fetch stage. A hit or miss in the OPTB 108 is determined at the end of the Fetch stage. This is done in parallel with a probe of the Main Translation Buffer 126, using the same Virtual Address.

The before mentioned traps associated with the Translation buffers include the following.

Long Address Translation (LAT): The selected entry in the Main Translation Buffer 126 is not valid, or the required Page Frame Number for the Virtual Address is not present in the Main Translation Buffer 126 (miss).

Short Address Translation (SAT): The selected entry in the Operand Prefetch Translation Buffer 108 does not contain the Page Frame Number for the sourced Virtual Address (miss), but the Page Frame Number is present and valid in the Main Translation Buffer 126. The Operand Prefetch Translation Buffer 108 is then loaded with the Page Frame Number contained in the Main Translation Buffer 126.

A further aspect of the invention provides for 24-bit or 31-bit address support on an instruction by instruction basis. Two Address Mode (AMODE) control bits are input to the EAU 44: AMODE1 and AMODE2. These bits are sourced from the CSU 32 and are initially set by the operating system to specify addressing types. When both AMODE1 and AMODE2 are off (zero), 24-bit addressing is forced. When both AMODE1 and AMODE2 are on (one), 31-bit addressing is forced. When the AMODE bits differ, then 24-bit or 31-bit addressing is selectable on an instruction by instruction basis. An IURAM 46 bit referred to as IU Alternate Address Mode (IUALTAM) determines which of the two AMODE bits are examined by an AMODE Generator (AMODE_GEN) 190 to determine address control. If IUALTAM=1 then the EAU 44 specifies addressing, for the associated instruction, in accordance with the state of AMODE1. If IUALTAM=0 the EAU 44 specifies addressing, for the associated instruction, in accordance with the state of AMODE2. The output of AMODE_GEN 190 is applied to buffer logic 192, 194, and 196 to select a number of bits (24 or 31) that are employed to form the Operand Virtual Address that is driven to the EA bus 106 and, if required, to the IAG 52, and also to the EAF 104 and the VABUS 126.

As a result, data loaded into EAF 104 is already AMODE conditioned. Thus, during operand prefetch operations no further address conditioning is required. The IUALTAM bit from different pipeline stages is employed for this conditioning so that, by example, for address generation IUALTAM from the G stage (PLCIG 136) is used, while for microcode probes of VAR's 116, 120, and 112 the IUALTAM from the E stage (PLCIE 142) is used.

A detailed description is now provided of the operation of the BHT 42.

The BHT 42 is implemented as a 4K-entry, direct mapped cache. Major components of the BHT 42 include the 4K×12-bit BHT TAG RAM 42c that is indexed by PIABUS 90 <17...28> with a Tag provided by PIABUS 90 <05...16>. The output is the MATCH lines which together form the enabling BHT Match signal. The BHT 42 also includes the 4K×30-bit BHT TARGET RAM 42a that is indexed by PIABUS 90 <17...28>. The output is a 30-bit Branch Target Address, corresponding to bits <1...30> of a Branch destination (target) address. The BHT 42 also includes the 4K×4-bit BRANCH MARK RAM 42b that is indexed by PIABUS 90 <17...28>. The output is the four Mark bits, each of which is associated with one halfword of the current instruction doubleword being accessed from IC 28. Each MARK bit corresponds to, that is Marks, a halfword of the IC 28.

A MARK bit on, or asserted, indicates that the doubleword being output by IC 28 contains, at the Marked halfword location, a Branch instruction that is predicted to be taken. A decoder 42d decodes PIABUS 90 <29,30> to generate the MARK bits for storage in the BRANCH MARK RAM 42b when the execution of a Branch instruction causes program execution to be directed to the Branch Target Address.

Associated with the BHT 42 is the before mentioned 30-bit TARIRQ register 152. TARIRQ 152 is fed from the BHT TARGET RAM 42a and contains a Target Address for a Branch instruction in either IR1 82, IR2 84, or IR3 86. This register is only used if IR0 80 contains a Branch instruction which is predicted to be taken (i.e. TARIR0 148 already contains a BHT TARGET address.

TARIR0 148 is a 30-bit register that is fed from the BHT TARGET RAM 42a, or from TARIRQ 152, and contains a Target Address for a Branch instruction held in either IR0, IR1, IR2, or IR3. As was previously stated, the contents of TARIR0 148 may be output to the PIABUS 90, via multiplexer 154, in place of PIAR 160 so as to redirect instruction prefetching to the Branch Target Address contained therein.

TARIRG 176 is fed from TARIR0 148 and contains a Target Address for a Branch instruction in IRG 92. TARIRF 178 is fed from TARIRG 176 and contains a Target Address for a Branch instruction in IRF 94. TARIRE 182 is fed from TARIRF 178 and contains a Target Address for a Branch instruction in IRE 94. The content of TARIRE 182 is compared against the PABUS 168, when a predicted Branch reaches IRE 96, with a comparator 198, and generates a signal BHT_PA_OK to indicate that the Target Address is accurate. That is, the output of TARIRE 182 is used to verify that the previously taken Branch Target Address is equal to the Branch Target Address that is calculated by the EAU 44 for the corresponding Branch instruction that is currently in IRE 96.

A Branch Table Register (BTR) 200 is a 30-bit register that is fed from the PABUS 168. BTR 200 is the input to the BHT TARGET RAM 42a, via BHTTAR bus 146. BTR 200 is loaded on a first micro-cycle of a Branch instruction that has reached IRE 96 and, as a result, contains the Target Address of the Branch (i.e. the OP2 address of the Branch instruction that is automatically probed and loaded into PAR2 50b when the Branch instruction moves from the F to E stage).

Having described in detail the various components associated with the BHT 42, a further description of the operation of the BHT 42 is now provided.

As the IPU 26 prefetcher indexes the IC 28, via PIABUS 90, attempting to keep the IQ full, the same address indexes the BHT 42. As a doubleword of data is output from the IC 28 a MARK, MATCH, and TARGET may also be output from the BHT 42.

As was stated, IC 28 data is a doubleword wide and may contain up to four instructions, each a halfword in length. The BHT 42, being addressed by the same PIABUS 90 bits, contains one Target address for any one doubleword of instructions. Thus, there is predicted one Branch instruction per doubleword, even if there is more then one Branch instruction contained within the doubleword. If a doubleword does contain more than one Branch instruction, then the Branch instruction that is Marked is the one most recently encountered, which was also taken.

A Branch instruction proceeds through the pipeline one stage at a time, just as any other instruction. If the Branch instruction does not have a corresponding BHT 42 entry, then it is predicted not to be taken, and when the Branch instruction is moved from IAG 52 to IAF 54, IAG 52 is loaded with the next sequential address.

If a Branch instruction does have a corresponding BHT 42 entry, then two data items must accompany the Branch instruction through the pipeline. One item is the MARK bit. As was noted above, IR0–IR3 each include storage for a MARK bit, in a similar manner as each IR includes storage for a Valid bit. The other item is the BHT TARGET address. As was described above, the Target address travels down the TARIRO-TARIRE registers associating itself with the corresponding IR register. As was previously described, when the Target Address reaches TARIRE 182, the comparator 198 ensures that the calculated Target Address, as indicated on PABUS 168, equals the predicted Target Address.

When the system 10 is first reset, the BHT 42 is cleared. This is accomplished by a single microcode command 'CLBHT'. As a result, all MARK bits in the BHT_MARK RAM 42b are zeroed, thus indicating that no instructions are marked as Branches to be taken. All Branch instructions are thus initialized to a same prediction state, that is, predicted not to be taken. When a Branch instruction is encountered for the first time, if it fails (is not taken), it executes in 30 ns and the next sequential instruction is Dispatched to. If the Branch instruction is taken, the Dispatch cannot be taken, as the IPU 26 is pointing to the next sequential instruction. Thus, before proceeding the microcode loads the BHT_TARGET RAM 42a with the Branch Target Address, stored in BTR 200, and then restarts the pipeline at the Branch Target Address. Microcode also sets the corresponding MARK bit in BHT_MARK RAM 42b, and stores the 12 PIABUS 90 Tag bits <05:16> into BHT_TAG RAM 42c.

This is accomplished with the following commands; LBTR, PIAR, LABHT, PVAR2R, LIAG, LPIAR/-FETCH. The LBTR (load BTR 200) command is performed in the first microcycle of the macroinstruction. BTR 200 is loaded from the PABUS 168, which contains the Branch Target Address. The PIAR (Probe IAR) command is performed in the next microcycle to store the address of the Branch instruction into PAR2 50b. It should be noted that this is the physical address of the Branch instruction itself, and not the Target Address, which is already stored in BTR 200. The LABHT (Load Address BHT) command loads the BHT 42. The Address and Tag to the BHT 42 are provided from the PIABUS 90 which, during the LABHT command, is sourced from PABUS 168 via multiplexer 154. Data to the BHT TARGET RAM is sourced from BTR 200. The LABHT command thus causes the loading the BHT TARGET RAM 42a, the BHT MARK RAM 42b, and the BHT TAG RAM 42c.

The PVAR2R (Probe VAR2R) command (VAR2R 130 contains the Branch Target Address) supplies the virtual Branch Target Address to the VABUS 124. This is then used by LIAG (Load IAG) command to restart the IPU 26 at the Branch Target Address. The VABUS 124 value is also supplied to the MAIN Translation Buffer 126 which outputs a physical address which is loaded into PAR2 50. The LPIAR (Load PIAR) command then completes the IPU 26 restart at the Branch Target Address by sourcing PAR2 50b to the PIABUS 90, via PABUS 168 and multiplexer 154, to address the Branch Target Macroinstruction, and to load the Target Address+1 doubleword into PIAR 160, via adder 162 and multiplexer 164. The FETCH command has no effect if the Instruction Cache 28 'hits'. If the Instruction Cache 28 'misses', then the Fetch command causes the SUI 24 to retrieve the data from the Main Memory 16.

As a result, if the Branch instruction is encountered again it will be identified as a Branch instruction that is predicted to be taken, and pipeline instruction prefetching redirection will occur.

While the invention has been particularly shown and described with respect to a preferred embodiment thereof, it will be understood by those skilled in the art that changes in form and details may be made therein without departing from the scope and spirit of the invention.

What is claimed is:

1. Apparatus for use in a digital data processor for prefetching individual ones of a plurality of instructions prior to execution of the instructions, the apparatus comprising:

means for generating sequential ones of a plurality of instruction physical addresses;

instruction cache means having an input responsive to said instruction physical addresses and an output for providing a corresponding instruction;

instruction queue means having an input coupled to said output of said instruction cache means and having a plurality of register means, each of said register means having a width sufficient to store at least a portion of one instruction;

instruction pipeline means comprised of a plurality of serially coupled register means each having a width sufficient to store a widest possible instruction, said instruction pipeline means having an input coupled to an output of said instruction queue means and an output for coupling to instruction execution means;

wherein some of said instructions are Branch instructions having a Target Address, and wherein said apparatus further includes, Branch history table means having an input responsive to said instruction physical addresses and an output for providing an indication of whether, during a preceding execution of a corresponding Branch instruction output by said instruction cache means, said execution of said corresponding Branch instruction resulted in subsequent program execution being redirected to said Target Address of said corresponding Branch instruction, and wherein each of said register means of said instruction queue means and said instruction pipeline means further includes means for storing said indication and for advancing said stored indication through said instruction queue means and through said instruction pipeline means in association with a corresponding Branch instruction.

2. Apparatus as set forth in claim 1 and further including means, having inputs coupled to outputs of said instruction pipeline means, for generating an effective address of an operand or operands that are required for the execution of certain of said instructions, and wherein said plurality of serially coupled register means of said instruction pipeline means includes:

first register means (IRG), having an input coupled to said output of said instruction queue means, for storing said instruction during an effective address generation operation for said instruction;

second register means (IRF), having an input coupled to an output of said IRG register means, for storing said instruction during an operand prefetch operation for said instruction; and third register means (IRE), having an input coupled to an output of said IRF register means and an output coupled to said instruction execution means, for storing said instruction during said execution of said instruction.

3. Apparatus as set forth in claim 2 wherein said effective address generating means includes a plurality of serially coupled address register means comprising:

first register means (IAG) for storing a virtual instruction address during said effective address generation operation for said instruction;

second register means (IAF), having an input coupled to an output of said IAG register means, for storing said virtual instruction address during said operand prefetch operation for said instruction; and third register means (IAE), having an input coupled to an output of said IAF register means, for storing said virtual instruction address during said execution of said instruction, and wherein said effective address generating means further includes, fourth register means (IAR), having an input coupled to an output of said IAE register means, for retaining said virtual instruction address for use in event that said instruction is a Branch instruction that fails a Branch condition during an execution of said Branch instruction.

4. Apparatus as set forth in claim 2 wherein said Branch history table means is further comprised of Target Address storage means for outputting a predicted Target Address for a corresponding Branch instruction output by said instruction cache means, and further including:

first register means (TARIR0), having an input coupled to an output of said Target Address storage means, for storing said Target Address of a Branch instruction stored within said instruction queue means;

second register means (TARIRG), having an input coupled to said output of said TARIR0 register means, for storing said Target Address during said effective address generation operation for said Branch instruction that is stored within said instruction queue means;

third register means (TARIRF), having an input coupled to an output of said TARIRG register means, for storing said Target Address during said oper- and prefetch operation for said Branch instruction that is stored within said instruction queue means; and fourth register means (TARIFE), having an input coupled to an output of said TARIRF register means, for storing said Target Address during said execution of said Branch instruction; and wherein said apparatus further includes, comparator means, having a first input coupled to an output of said TARIFE register means and a second input coupled to an output of a Target Address calculation means, for comparing said calculated Target Address to said predicted Target Address for indicating if said execution of said Branch instruction results in program redirection to the same Target Address as said predicted Target Address.

5. Apparatus as set forth in claim 2 wherein certain ones of said instructions reference specified ones of a plurality of general register means, and wherein said effective address generating means includes:

means for storing a current, duplicate copy of a content of each of said plurality of general register means; and wherein said effective address generating means includes means, responsive to prefetched instructions, for calculating said effective address of an operand that is required to execute a prefetched instruction, in cooperation with a content of said storing means.

6. Apparatus as set forth in claim 5 wherein said storing means has inputs coupled to outputs of said execution means for storing information in said copy of said general register means in synchronism with a storage of information in said general register means, and further including suspending means, responsive to an occurrence of a previously prefetched instruction that modifies, during an execution of said previously prefetched instruction, a content of said general register means, for suspending an occurrence of said effective address calculation for an instruction contained in said IRG register means until an execution of said previously prefetched instruction modifies said content of said general register means.

7. Apparatus as set forth in claim 5 wherein said storing means has inputs coupled to outputs of said execution means for storing information in said copy of said general register means in synchronism with a storage of information in said general register means, and further including bypassing means, responsive to an occurrence of a previously prefetched instruction that modifies, during an execution of said previously prefetched instruction, a content of said storing means, for bypassing said storing means and for receiving said information instead from said execution means for use in calculating an effective address of an operand associated with an instruction that is prefetched subsequent to said instruction that modifies said general register means.

8. Apparatus as set forth in claim 1 and further comprising:

store means (IURAM) having an input coupled to an output of said instruction queue means and being responsive to an instruction for outputting a plurality of control signals that are associated with said instruction;

means for generating an effective address of an operand or operands that are required for the execution of certain of said instructions;
wherein said effective address generating means is responsive to a plurality of input signals, set by an operating system, that specify an addressing mode and to at least one of said control signals for selectively generating, for each instruction, one of an effective address having a first number of bits and an effective address having a second number of bits.

9. Apparatus as set forth in claim 1, wherein said instruction pipeline means is comprised of:
first register means (IRG), having an input coupled to said output of said instruction queue means, for storing said instruction during an effective address generation operation for said instruction;
second register means (IRF), having an input coupled to an output of said IRG register means, for storing said instruction during an operand prefetch operation for said instruction; and
third register means (IRE), having an input coupled to an output of said IRF register means and an output coupled to said instruction execution means, for storing said instruction during said execution of said instruction; and wherein said apparatus is further comprised of,
means for generating a first virtual effective address of an operand or operands that are required for an instruction stored within said IRG register means of said instruction pipeline means, said generating means including means for subsequently generating a second virtual effective address for said instruction after said instruction is advanced to said IRF register means;
virtual address translation buffer means responsive to said virtual effective addresses for converting said virtual effective addresses into corresponding physical addresses; and
data cache means having an input responsive to a physical address and an output for providing a corresponding operand for use by said execution means; and wherein
said virtual address translation buffer means includes a first translation buffer means having a first number of page frame entries responsive to said first virtual effective address for prefetching, if possible, a required operand from said data cache means, and a second translation buffer means having a second number of page frame entries responsive to said second virtual effective address, wherein said first number of page frame entries is less than said second number of page frame entries.

10. Apparatus as set forth in claim 9 wherein said virtual address translation buffer means includes means for generating an indication if a selected page frame entry is not present within said first translation buffer means but is present, and valid, within said second virtual address translation buffer means; and further comprising a data path for transferring at least a portion of a page frame entry from said second virtual address translation buffer means to said first virtual address translation buffer means.

11. Apparatus for use in a digital data processor for prefetching individual ones of a plurality of instructions prior to execution of said instructions, said apparatus comprising:

means for generating sequential ones of a plurality of instruction physical addresses;
instruction cache means having an input responsive to said instruction physical addresses and an output for providing a corresponding instruction;
instruction queue means having an input coupled to said output of said instruction cache means and having a plurality of register means, each of said register means having a width sufficient to store one instruction or a portion of one instruction;
instruction pipeline means comprised of a plurality of serially coupled register means each having a width sufficient to store a widest possible instruction, said instruction pipeline means having an input coupled to an output of said instruction queue means and an output for coupling to instruction execution means; means for generating an effective address of an operand or operands that are required for execution by certain ones of said instructions that are output from said instruction cache means;
wherein said certain ones of said instructions that are output from said instruction cache means reference specified ones of a plurality of general register means, and wherein said effective address generating means comprises,
means for storing a current, duplicate copy of each of said plurality of general register means; and
wherein said effective address generating means includes means, responsive to prefetched instructions, for calculating said effective address of an operand that is required to execute a prefetched instruction, in cooperation with a content of said means that stores a current, duplicate copy of each of said general register means.

12. Apparatus as set forth in claim 11 and further comprising:
instruction control memory means having an input coupled to said output of said instruction queue means and being responsive to an instruction for outputting a plurality of control signals that are generated by an execution of the instruction; and
control signal pipeline means comprised of a plurality of serially coupled register means for storing said control signals and for advancing said control signals in synchronism with an advancement of the corresponding instruction through said instruction pipeline means;
wherein said effective address generating means further includes means for calculating said effective address of said operand as a function of said content of said storing means and as a function of one or more of said stored control bits.

13. Apparatus as set forth in claim 12 wherein said effective address generating means is further responsive to at least one of said stored control bits for generating, for each instruction, an effective address having a first number of bits, or an effective address having a second number of bits.

14. Apparatus as set forth in claim 13 wherein said first number of bits is 24 and wherein said second number of bits is 31.

15. Apparatus for use in a digital data processor for prefetching individual ones of a plurality of instructions prior to execution of said instructions, said apparatus comprising:
means for generating sequential ones of a plurality of instruction physical addresses;

instruction cache means having an input responsive to said instruction physical addresses and an output for providing a corresponding instruction;

means for generating an effective address of an operand or operands associated with certain ones of said instructions that are output from said instruction cache means;

instruction queue means having an input coupled to said output of said instruction cache means and having a plurality of register means, each of said register means having a width sufficient to store one instruction or a portion of one instruction;

instruction pipeline means comprised of a plurality of serially coupled instruction register means each having a width sufficient to store a widest possible instruction, said instruction pipeline means having an input coupled to an output of said instruction queue means and an output for coupling to instruction execution means, said plurality of serially coupled instruction register means including, first instruction register means (IRG), having an input coupled to said output of said instruction queue means, for storing an instruction during an effective address generation operation for said instruction;

second instruction register means (IRF), having an input coupled to an output of said IRG register means, for storing said instruction during an operand prefetch operation for said instruction; and third instruction register means (IRE), having an input coupled to an output of said IRF register means and an output coupled to said instruction execution means, for storing said instruction during said execution of said instruction;

wherein some of said instructions are Branch instructions having an associated Target Address, and wherein said apparatus further includes, Branch history table means having an input responsive to said instruction physical addresses and an output for providing an indication of whether, during a preceding execution of a corresponding Branch instruction output by said instruction cache means, said execution of said corresponding Branch instruction resulted in subsequent program execution being redirected to said Target Address associated with said corresponding Branch instruction, said Branch history table means being comprised of Target Address storage means for outputting a predicted Target Address associated with a corresponding Branch instruction output by said instruction cache means;

wherein each of said register means of said instruction queue means and said instruction pipeline means includes means for storing said indication output by said Branch history table means and for advancing said stored indication through said instruction queue means and through said instruction pipeline means in association with a corresponding Branch instruction;

wherein said effective address generating means includes a plurality of serially coupled address register means comprising, first address register means (IAG) for storing a virtual instruction address during an effective address generation operation for an instruction stored within said IRG register means;

second address register means (IAF), having an input coupled to an output of said IAG register means, for storing said virtual instruction address during said operand prefetch operation for an instruction stored within said IRF register means; and third address register means (IAE), having an input coupled to an output of said IAF register means, for storing said virtual instruction address during said execution of an instruction stored within said IRE register means, wherein said effective address generating means further includes, fourth address register means (IAR), having an input coupled to an output of said IAE register means, for retaining said virtual instruction address for use in event that said instruction is a Branch instruction that fails a Branch condition during an execution of said Branch instruction; said apparatus further comprising, first target address register means (TARIR0), having an input coupled to an output of said Branch history table means Target Address storage means, for storing a Target Address of a Branch instruction that is stored within said instruction queue means, said TARIR0 register means having an output coupled to said effective address generating means for providing said Target Address thereto;

second target address register means (TARIRG), having an input coupled to said output of said TARIR0 register means, for storing said Target Address during an effective address generation operation for said Target Address associated with a Branch instruction that is stored within said IRG register means;

third target address register means (TARIRF), having an input coupled to an output of said TARIRG register means, for storing said Target Address during an operand prefetch operation associated with a Branch instruction that is stored within said IRF register means; and fourth target address register means (TARIFE), having an input coupled to an output of said TARIRF register means, for storing said Target Address associated with a Branch instruction that is stored within said IRE register means during an execution of said Branch instruction.

16. Apparatus for use in a digital data processor for prefetching individual ones of a plurality of instructions prior to execution of said instructions, said apparatus comprising:

means for generating sequential ones of a plurality of instruction physical addresses;

instruction cache means having an input responsive to said instruction physical addresses and an output for providing a corresponding instruction;

instruction queue means having an input coupled to said output of said instruction cache means and having a plurality a register means, each of said register means having a width sufficient to store one instruction or a portion of one instruction;

instruction control memory means having an input coupled to said output of said instruction queue means and being responsive to an instruction for outputting a plurality of control signals that are generated by an execution of said instruction; and means for generating an effective address of an operand or operands that are required for the execution of certain of said instructions;

wherein said effective address generating means is responsive to a plurality of system control signals that specify an addressing mode, and to at least one of said control signals output from said instruction control memory means, for being capable of selectively generating on an instruction by instruction basis one of an effective address having a first number of bits and an effective address having a second number of bits.

17. Apparatus as set forth in claim 16 wherein when two of said plurality of system control signals have a first same logical state a 24-bit effective address is always generated, wherein when said two of said plurality of system control signals have a second same logical state a 31-bit effective address is always generated, and wherein when said two of said plurality of system control signals have different logical states, one of a 24-bit and a 31-bit effective address is selectively generated as a function of a state of said at least one control signal output from said instruction control memory means.

18. Apparatus as set forth in claim 16 and further comprising:
   instruction pipeline means comprised of a plurality of serially coupled register means each having a width sufficient to store a widest possible instruction, said instruction pipeline means having an input coupled to an output of said instruction queue means and an output for coupling to instruction execution means; and
   pipeline means for storing said at least one of said control signals output from said instruction control memory means and for advancing said at least one control signal in synchronism with an advancement of a corresponding instruction through said instruction pipeline means.

19. Apparatus for use in a digital data processor for prefetching individual ones of a plurality of instructions prior to execution of said instructions, said apparatus comprising:
   means for generating sequential ones of a plurality of instruction physical addresses;
   instruction cache means having an input responsive to said instruction physical addresses and an output for providing a corresponding instruction;
   instruction queue means having an input coupled to said output of said instruction cache means and having a plurality of register means, each of said register means having a width sufficient to store one instruction or a portion of one instruction;
   instruction pipeline means comprised of a plurality of serially coupled register means each having a width sufficient to store a widest possible instruction, said instruction pipeline means having an input coupled to an output of said instruction queue means and an output for coupling to instruction execution means; said instruction pipeline means comprising,
   first register means (IRG), having an input coupled to said output of said instruction queue means, for storing said instruction during an effective address generation operation for said instruction;
   second register means (IRF), having an input coupled to an output of said IRG register means, for storing said instruction during an operand prefetch operation for said instruction; and
   third register means (IRE), having an input coupled to an output of said IRF register means and an output coupled to said instruction execution means, for storing said instruction during said execution of said instruction;
   means for generating a first virtual effective address of an operand or operands [associated with]that are required for execution of an instruction stored within said IRG register means of said instruction pipeline means, said generating means including means for subsequently generating a second virtual effective address for said instruction after said instruction is advanced to said IRF register means;
   virtual address translation buffer means responsive to said virtual effective addresses for converting said virtual effective addresses into a corresponding physical addresses; and
   data cache means having an input responsive to said physical address and an output for providing a corresponding operand for use by said execution means; and wherein
   said virtual address translation buffer means includes a first translation buffer means having a first number of page frame entries responsive to said first virtual effective address for prefetching, if possible, a required operand from said data cache means, and a second translation buffer means having a second number of page frame entries responsive to said second virtual effective address, wherein said first number of page frame entries is less than said second number of page frame entries.

20. Apparatus as set forth in claim 19 wherein said virtual address translation buffer means includes means for generating an indication if a selected page frame entry is not present within said first translation buffer means but is present, and valid, within said second virtual address translation buffer means; and further comprising a data path for transferring at least a portion of a page frame entry from said second virtual address translation buffer means to said first virtual address translation buffer means.

* * * * *